United States Patent
Yamamoto et al.

(10) Patent No.: US 8,147,073 B2
(45) Date of Patent: Apr. 3, 2012

(54) IMAGE SIGNAL PROCESSING APPARATUS AND VIRTUAL REALITY CREATING SYSTEM

(75) Inventors: Atsuyuki Yamamoto, Sakai (JP); Masanori Kashiwagi, Moriguchi (JP)

(73) Assignee: Panasonic Corporation, Osaka (JP)

( * ) Notice: Subject to any disclaimer, the term of this patent is extended or adjusted under 35 U.S.C. 154(b) by 560 days.

(21) Appl. No.: 12/278,304

(22) PCT Filed: Feb. 20, 2007

(86) PCT No.: PCT/JP2007/000102
§ 371 (c)(1), (2), (4) Date: Aug. 5, 2008

(87) PCT Pub. No.: WO2007/097118
PCT Pub. Date: Aug. 30, 2007

(65) Prior Publication Data
US 2009/0059096 A1    Mar. 5, 2009

(30) Foreign Application Priority Data

Feb. 20, 2006 (JP) ................. 2006-043093
Sep. 22, 2006 (JP) ................. 2006-257932

(51) Int. Cl.
   *G03B 21/14*     (2006.01)
   *G03B 21/00*     (2006.01)
   *H04N 13/02*     (2006.01)

(52) U.S. Cl. ............................. 353/69; 348/46

(58) Field of Classification Search .............. 353/7, 10, 353/69, 70, 121; 348/46–50; 359/470; 345/582; 382/274, 275
See application file for complete search history.

(56) References Cited

U.S. PATENT DOCUMENTS
6,462,769 B1   10/2002   Trowbridge et al.
(Continued)

FOREIGN PATENT DOCUMENTS
CN    1698358    11/2005
(Continued)

OTHER PUBLICATIONS

Shibano et al., "CyberDome: PC Clustered Hemi Spherical Immersive Projection Display", International Conference on Artificial Reality and Tele-Existence, XX, XX, Dec. 5, 2003, XP002437177.
(Continued)

*Primary Examiner* — William C Dowling
*Assistant Examiner* — Ryan Howard
(74) *Attorney, Agent, or Firm* — Greenblum & Bernstein, P.L.C.

(57) ABSTRACT

A virtual reality creating system including: a screen 1 including a projection plane of arbitrary shape; a distortion correction unit 3 which performs distortion correction for projecting image light onto the projection plane of arbitrary shape for a two-dimensional image signal to project image light onto a two-dimensional projection plane and then outputs the same; a parameter adjusting PC 5 which creates a distortion correction table as a correspondence map between the two-dimensional projection plane and a mesh model of the projection plane of arbitrary shape; and projectors 2a and 2b unit which project an image based on the image signal outputted from the image signal processing apparatus onto the screen. The distortion correction unit 3 receives the distortion correction table from the parameter adjusting PC 5 and performs distortion correction processing for each pixel of the two-dimensional image signal received by the image signal input unit with reference to the distortion correction table to generate the image signal to project the image light onto the projection plane of arbitrary shape. It is therefore possible to display images with reduced distortion of image light viewed by a viewer with a simple structure in real time.

11 Claims, 26 Drawing Sheets

U.S. PATENT DOCUMENTS

| | | | | |
|---|---|---|---|---|
| 6,834,965 | B2* | 12/2004 | Raskar et al. | 353/94 |
| 6,999,133 | B2* | 2/2006 | Krogstad et al. | 348/746 |
| 2003/0011535 | A1 | 1/2003 | Kikuchi et al. | |
| 2003/0137697 | A1 | 7/2003 | Sato et al. | |
| 2004/0184013 | A1 | 9/2004 | Raskar et al. | |
| 2004/0233276 | A1* | 11/2004 | Palovuori | 348/56 |
| 2005/0062755 | A1* | 3/2005 | Van Dyke et al. | 345/603 |

FOREIGN PATENT DOCUMENTS

| | | |
|---|---|---|
| JP | 1-198890 | 8/1989 |
| JP | 11-355733 | 12/1999 |
| JP | 2000-310826 | 11/2000 |
| JP | 2002-354400 | 12/2002 |
| JP | 2003-18503 | 1/2003 |
| JP | 3387487 | 1/2003 |
| JP | 2003-85586 | 3/2003 |
| JP | 2004-147064 | 5/2004 |
| JP | 2004-356989 | 12/2004 |
| JP | 2005-278160 | 10/2005 |
| JP | 2005-354644 | 12/2005 |
| TW | 200601832 | 1/2006 |
| WO | 2004/084547 | 9/2004 |

OTHER PUBLICATIONS

Surati, "Scalable Self-Calibrating Display Technology for Seamless Large-Scale Displays", Jan. 24, 1999, Thesis At the Massachusetts Institute of Technology, XX, XX, pp. 1-67, XP002275230.

Shibano et al., "CyberDome: PC Clustered Hemi Spherical Immersive Projection Display", International Conference on Artificial Reality and Tele-Existence, XX, XX, Dec. 5, 2003, XP002437177.

Raskar et al., "Multi-projector displays using camera-based registration", Visualization '99. Proceedings San Francisco, CA, USA Oct. 24-29, 1999, Piscataway, NJ, USA, IEEE, US, Jan. 1, 1999, pp. 161-522, XP031172599.

Shibano et al., "A New System for Interactive VR Applications Using a Compact Hemi Spherical IPD (CyberDome)", Proc. Virtual Reality International Conference (VRIC), [Online] May 2004, pp. 101-107, XP002482313, Retrieved from the Internet: URL:http://www.lab.ime.cmc.osaka-u.ac.jp/paper/datas/2004/05/Shibano_0080/Shibano_200405_paper.pdf, [retrieved on May 29, 2008].

Surati, "Scalable Self-Calibrating Display Technology for Seamless Large-Scale Displays", Jan. 24, 1999, Thesis at the Massachusetts Institute of Technology, XX, XX, pp. 1-67, XP002275230.

English language Abstract of JP 2003-18503, Jan. 17, 2003.
English language Abstract of JP 2000-310826, Nov. 7, 2000.
English language Abstract of JP 2002-148711, May 22, 2002.
English language Abstract of JP 2004-356989, Dec. 16, 2004.
English language Abstract of JP 2004-147064, May 20, 2004.
English language Abstract of JP 2003-85586, Mar. 20, 2003.
English language Abstract of JP 11-355733, Dec. 24, 1999.
English language Abstract of JP 2005-354644, Dec. 22, 2005.
English language Abstract of JP 1-198890, Aug. 10, 1989.
English language Abstract of JP 2005-278160, Oct. 6, 2005.

Shibano et al., "CyberDome: PC Clustered Hemi Spherical Immersive Projection Display", International Conference on Artificial Reality and Tele-Existence, ICAT 2003, pp. 1-7, Dec. 5, 2003.

Raskar et al., "Multi-Projector Displays Using Camera-Based Registration", Visualization '99. Proceedings San Francisco, CA, USA, Piscataway, NJ, USA, IEEE, pp. 1-9, Jan. 1, 1999.

Surati, "Scalable Self-Calibrating Display Technology for Seamless Large-Scale Displays", Thesis at the Massachusetts Institute of Technology, pp. 1-67, Jan. 24, 1999.

Chinese Office action in corresponding CN Application No. 200780006053.2, dated Feb. 1, 2011.

Canadian Office action in CA Application No. 2.641,484, dated Jan. 17, 2011.

* cited by examiner

[Fig. 1]
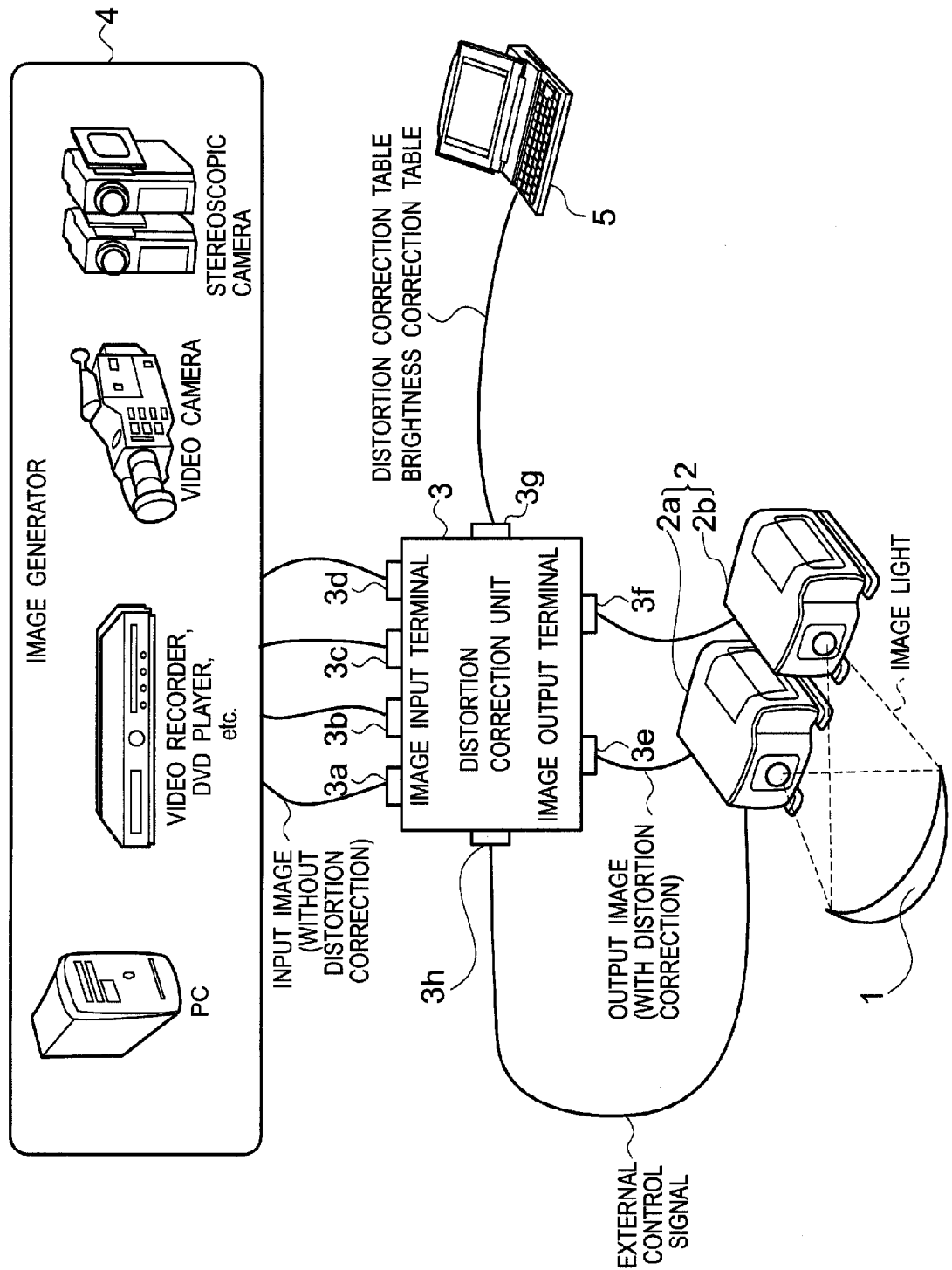

[Fig. 2]
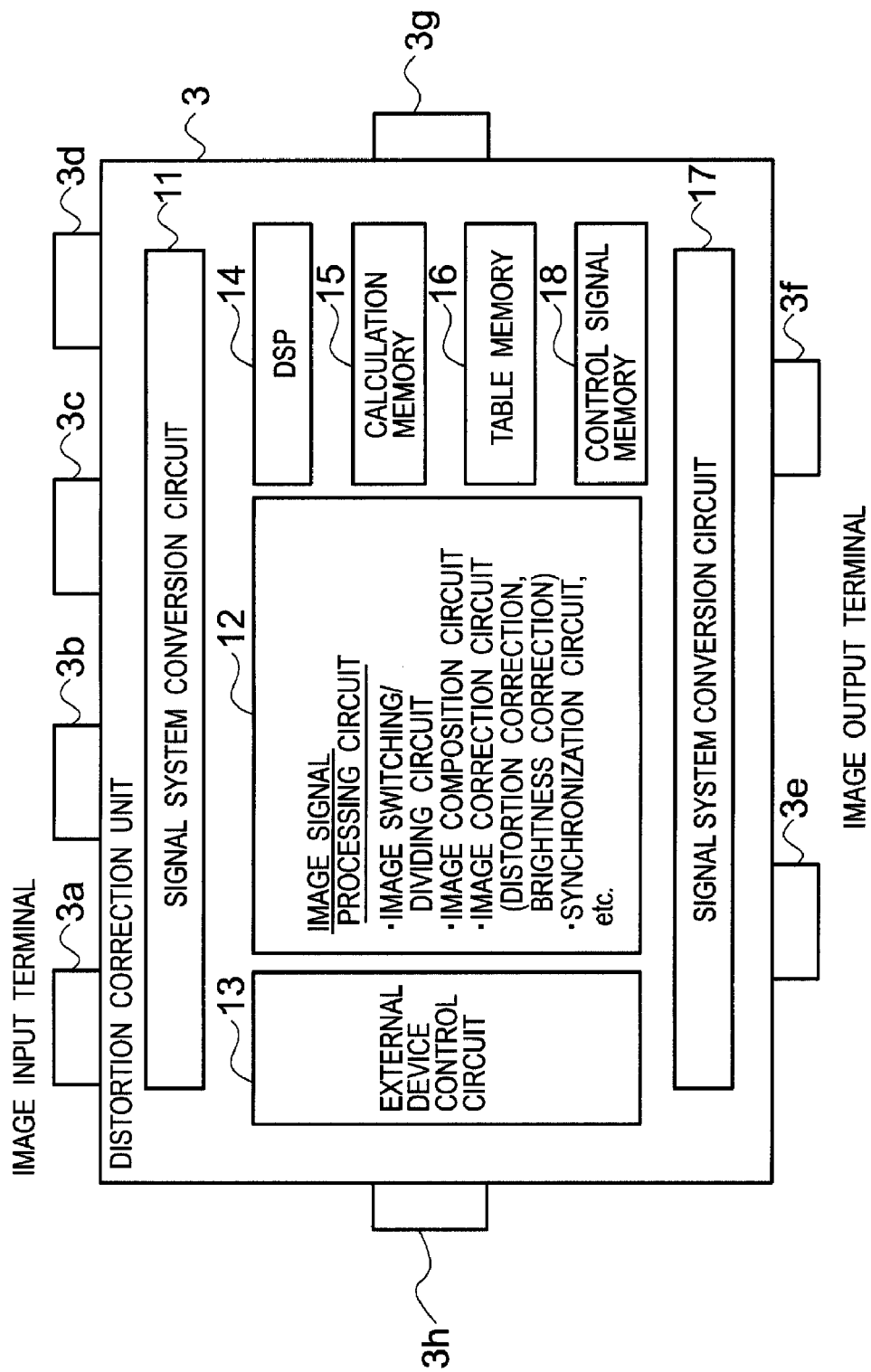

[Fig. 3]
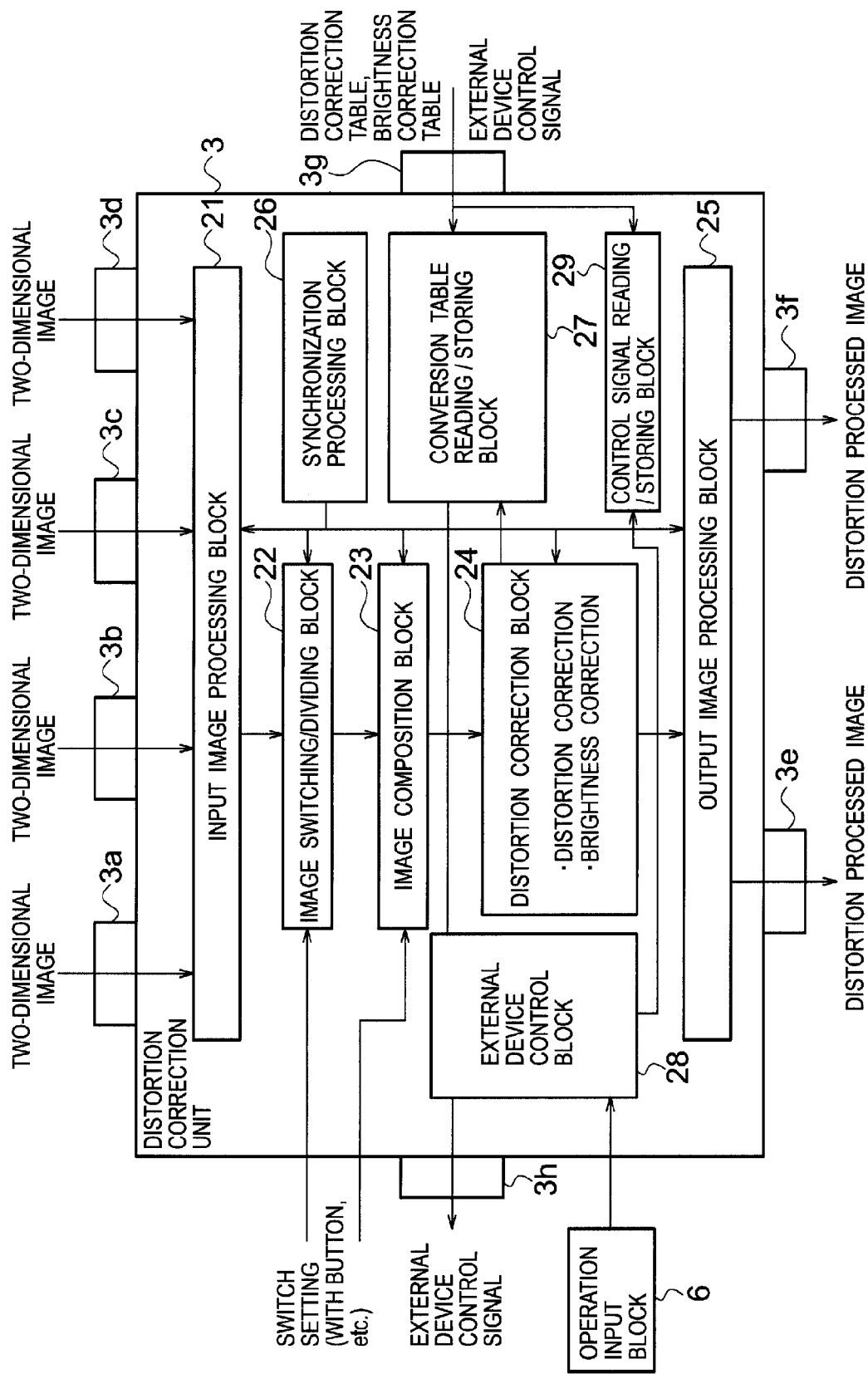

[Fig. 4]
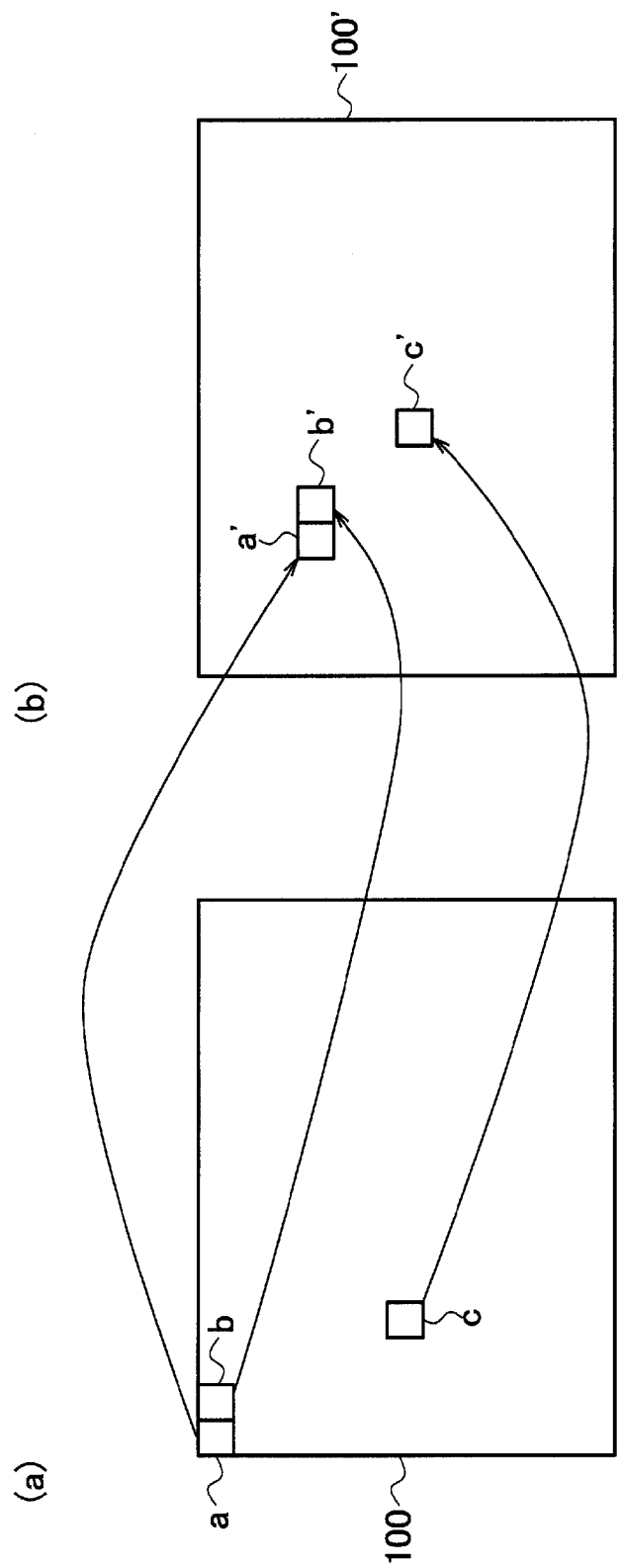

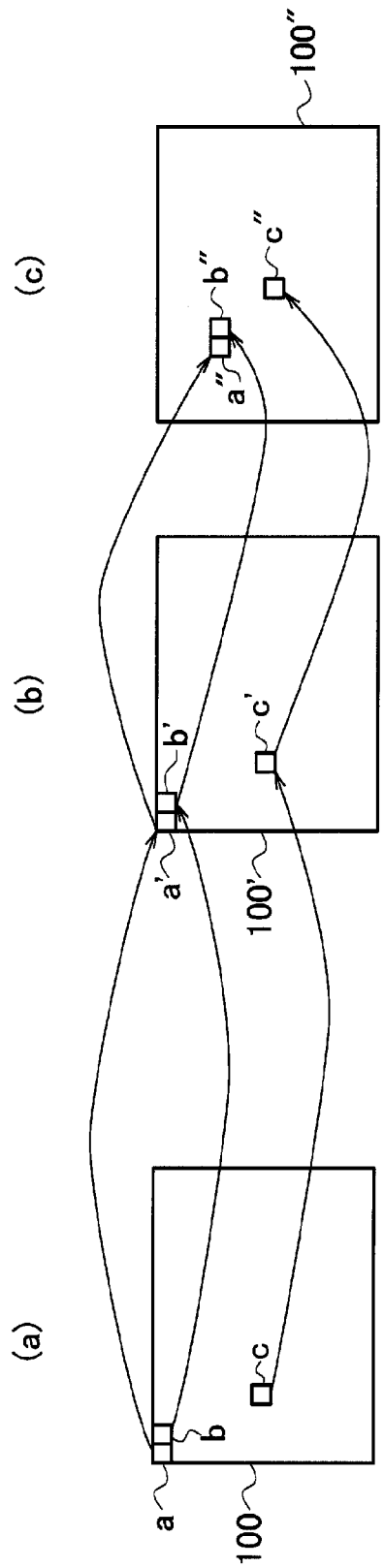
[Fig. 5]

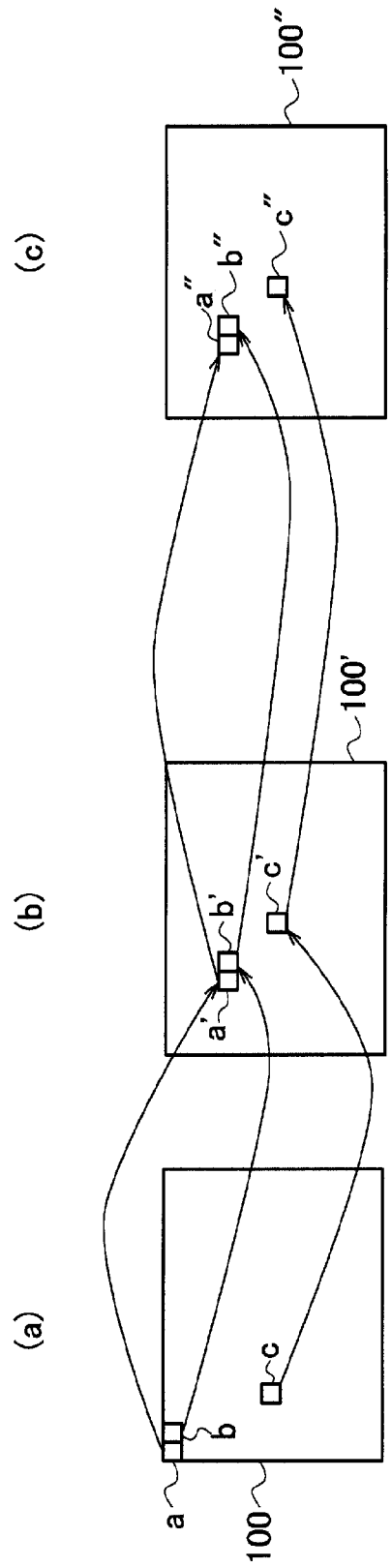
[Fig. 6]

[Fig. 7]
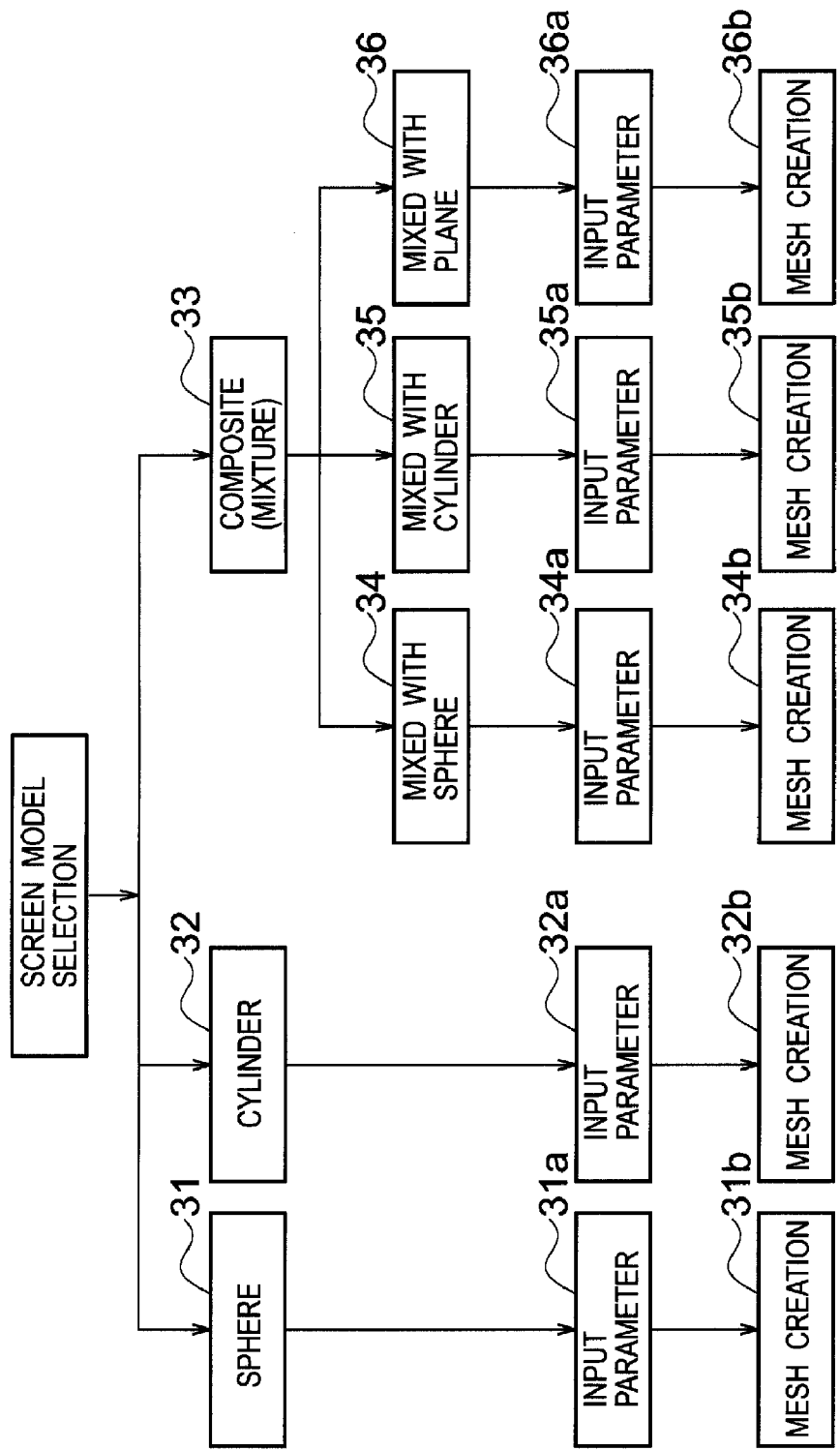

[Fig. 8]
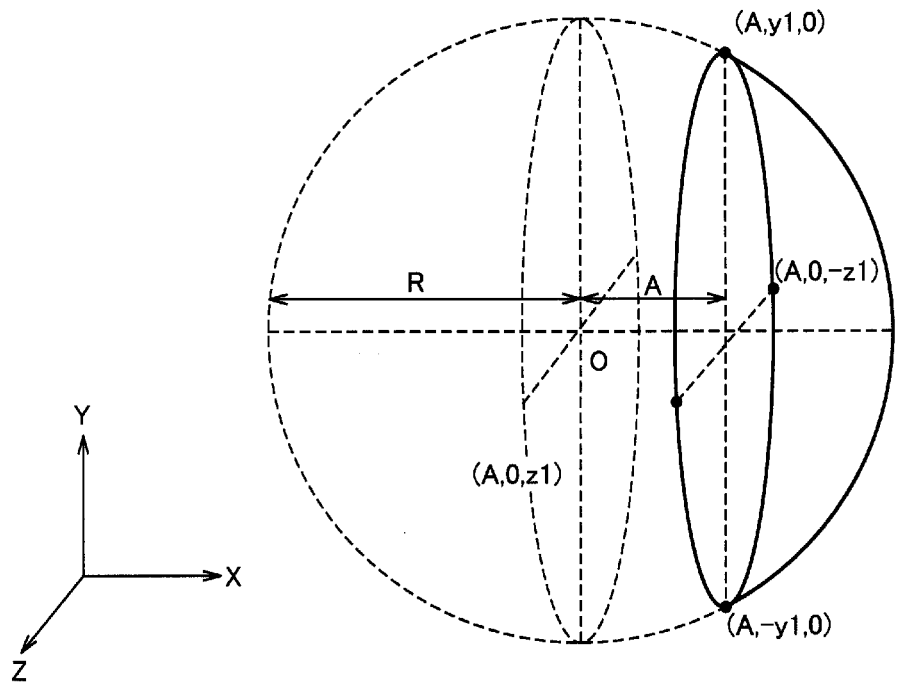
[Fig. 9]
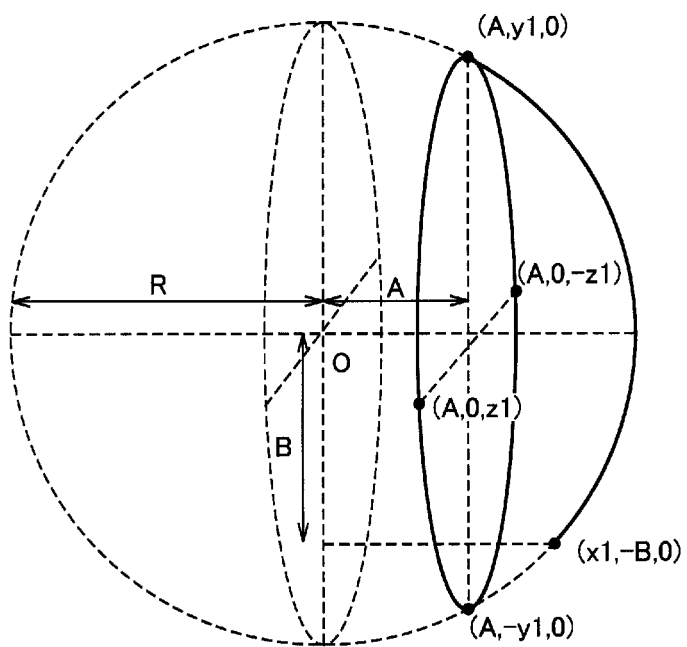

[Fig. 10]
(a) 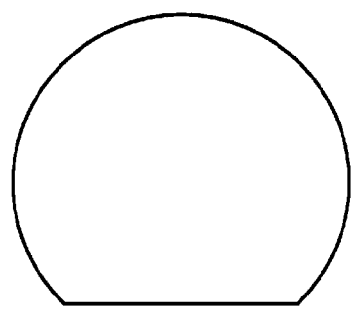
(b) 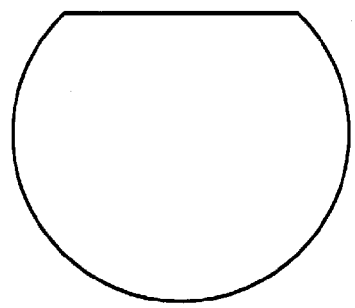
(c) 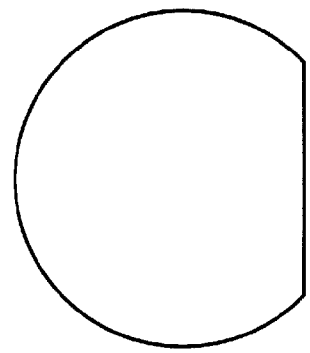
(d) 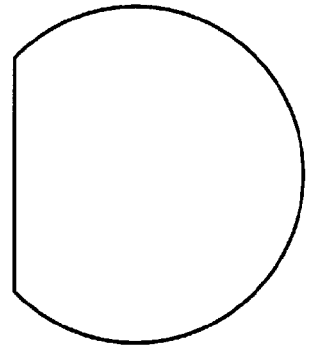

[Fig. 11]
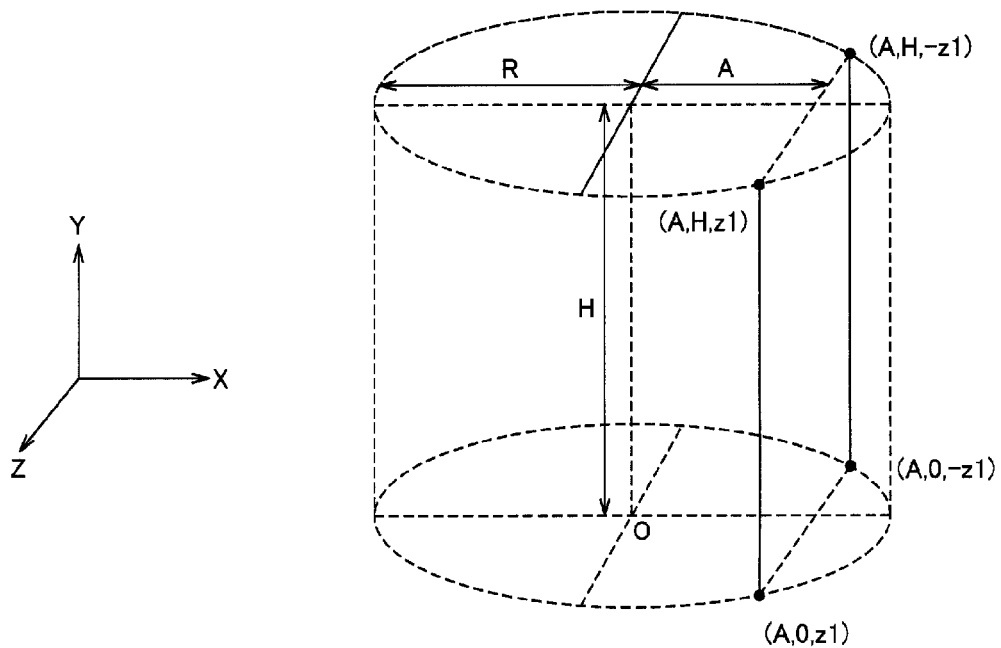
[Fig. 12]
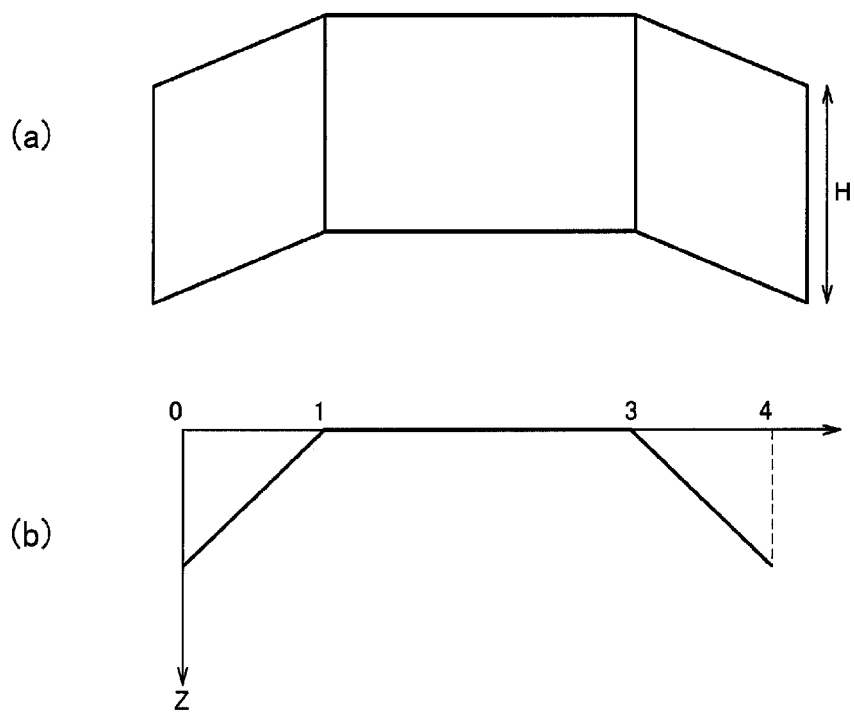
(a)
(b)

[Fig. 13]
(a)
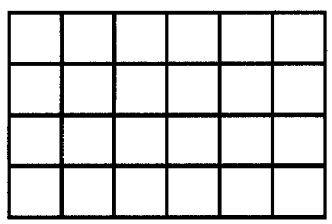 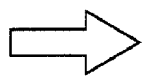 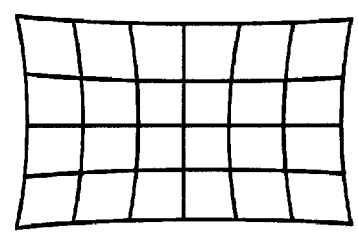
(b)
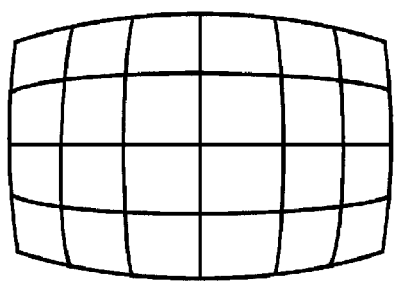 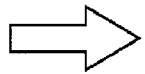 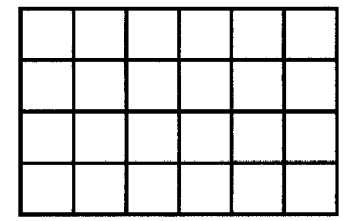

[Fig. 14]
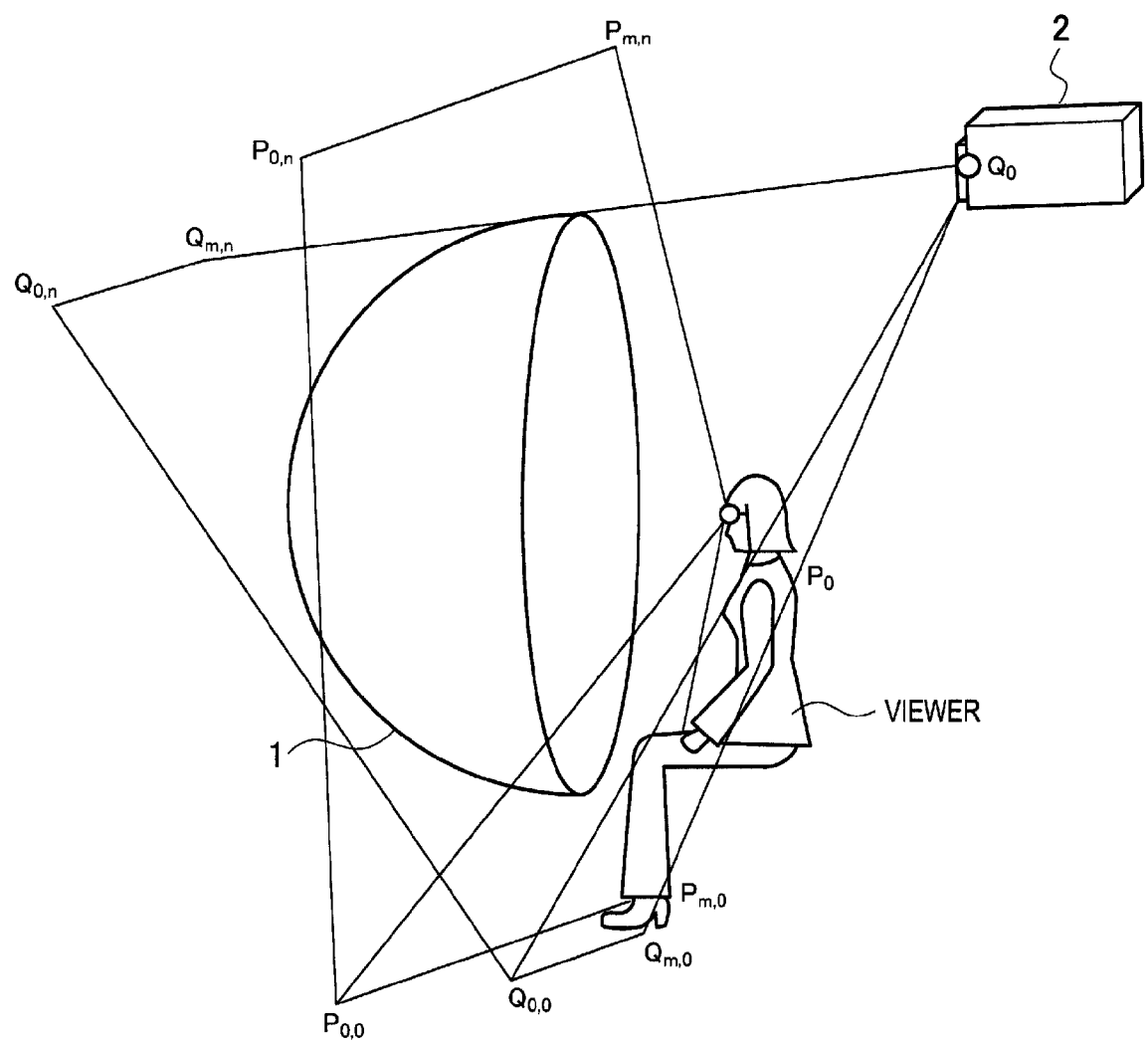

[Fig. 15]
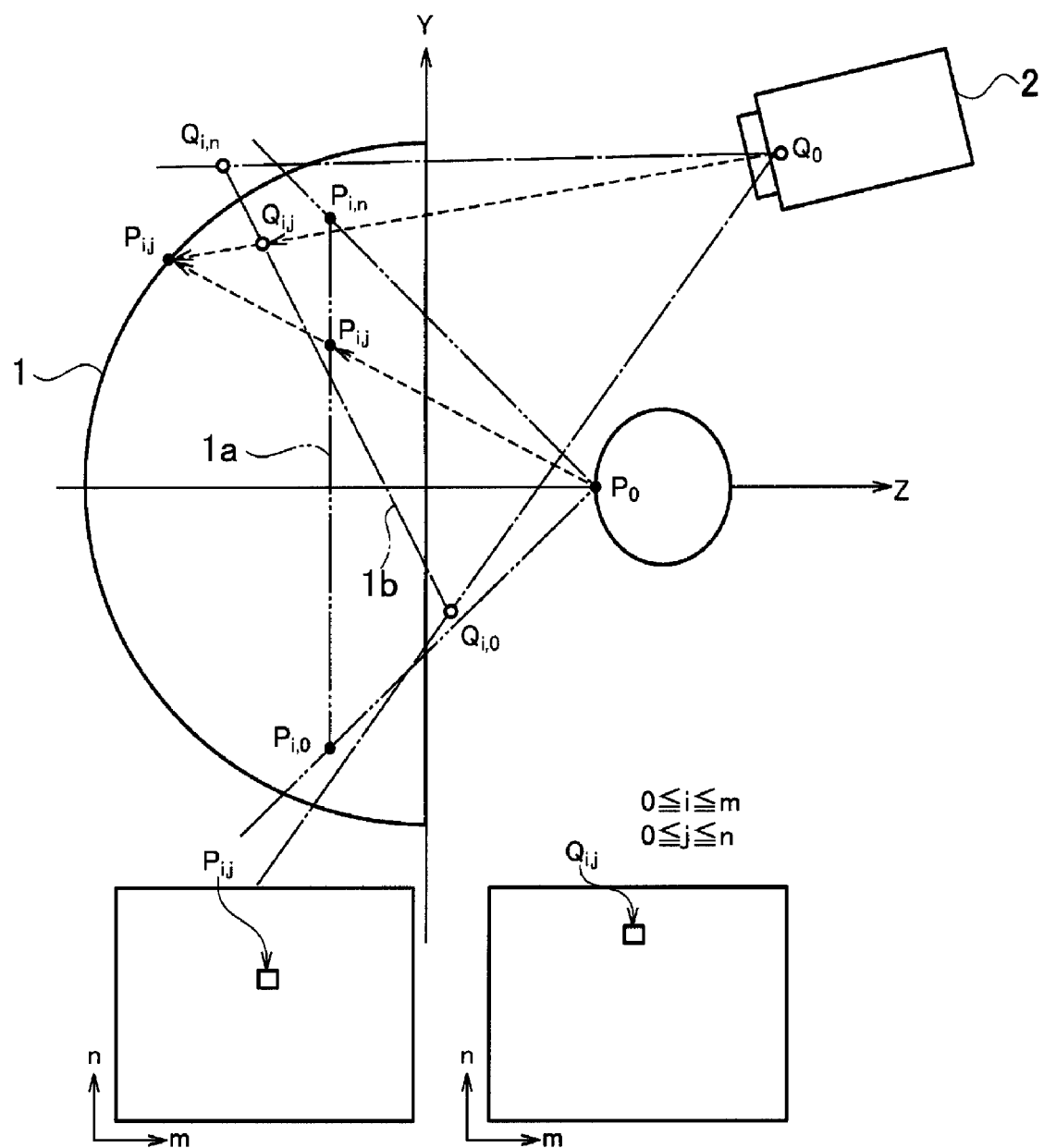

[Fig. 16]
(a)
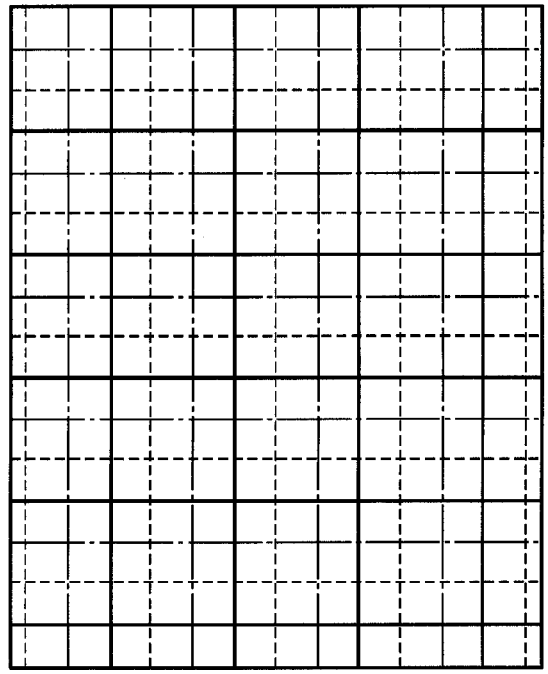
(b)
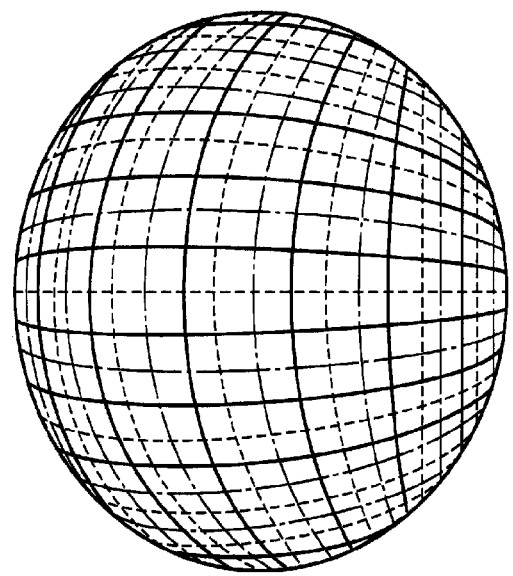

[Fig. 17]
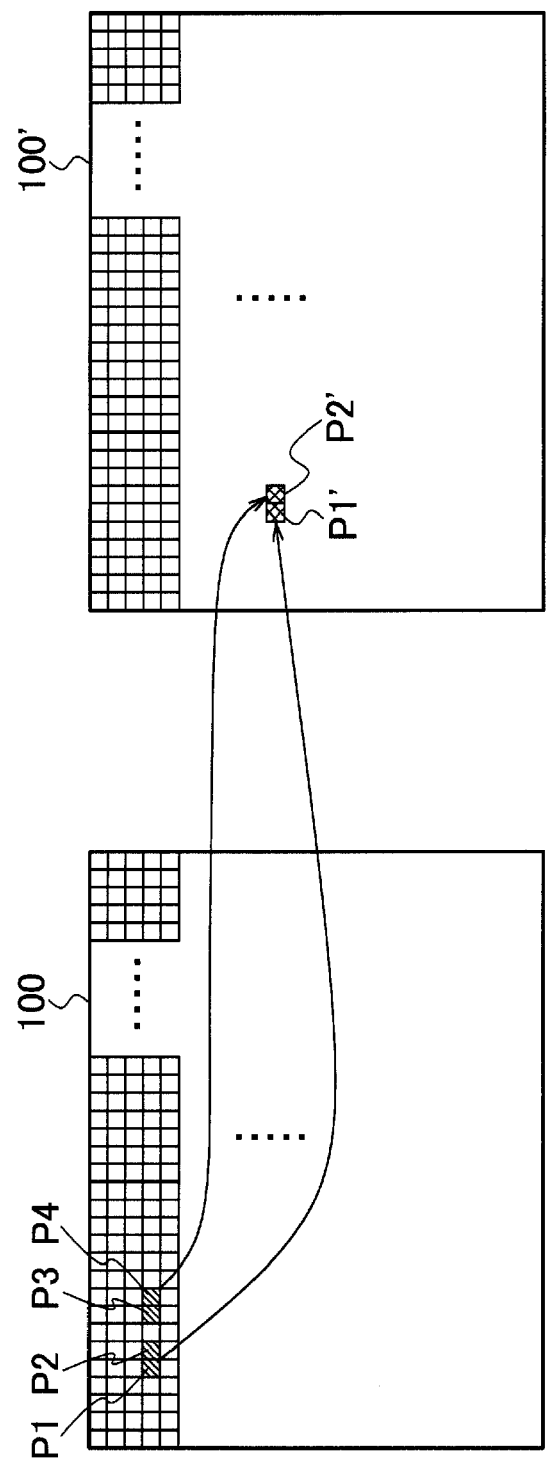

[Fig. 18]
(a)
PIXEL P : $(x+\Delta x, y)$
COLOR INFORMATION : $C_{x+\Delta x, y} = C_{x,y}(1-\Delta x) + C_{x+1,y}\Delta x$
PIXEL P1 : $(x, y)$
COLOR INFORMATION: $C_{x,y}$
PIXEL P2 : $(x+1, y)$
COLOR INFORMATION : $C_{x+1,y}$
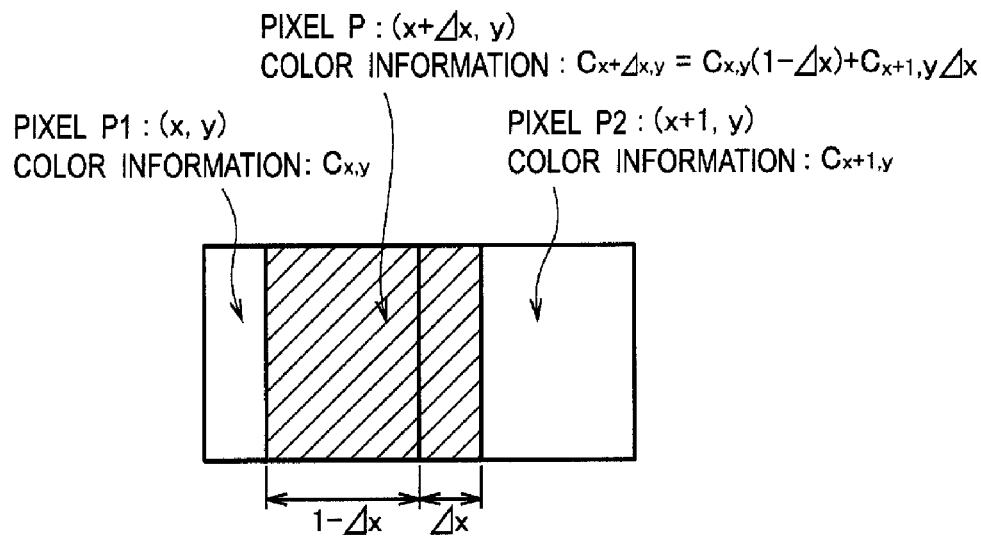
$1-\Delta x$  $\Delta x$
(b)
PIXEL P' : $(u, v)$
 CORRESPONDING TO $(x+\Delta x, y)$
COLOR INFORMATION : $C_{u,v} = C_{x+\Delta x, y}$
 $= C_{x,y}(1-\Delta x) + C_{x+1,y}\Delta x$
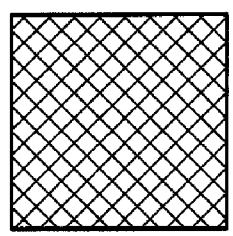

[Fig. 19]
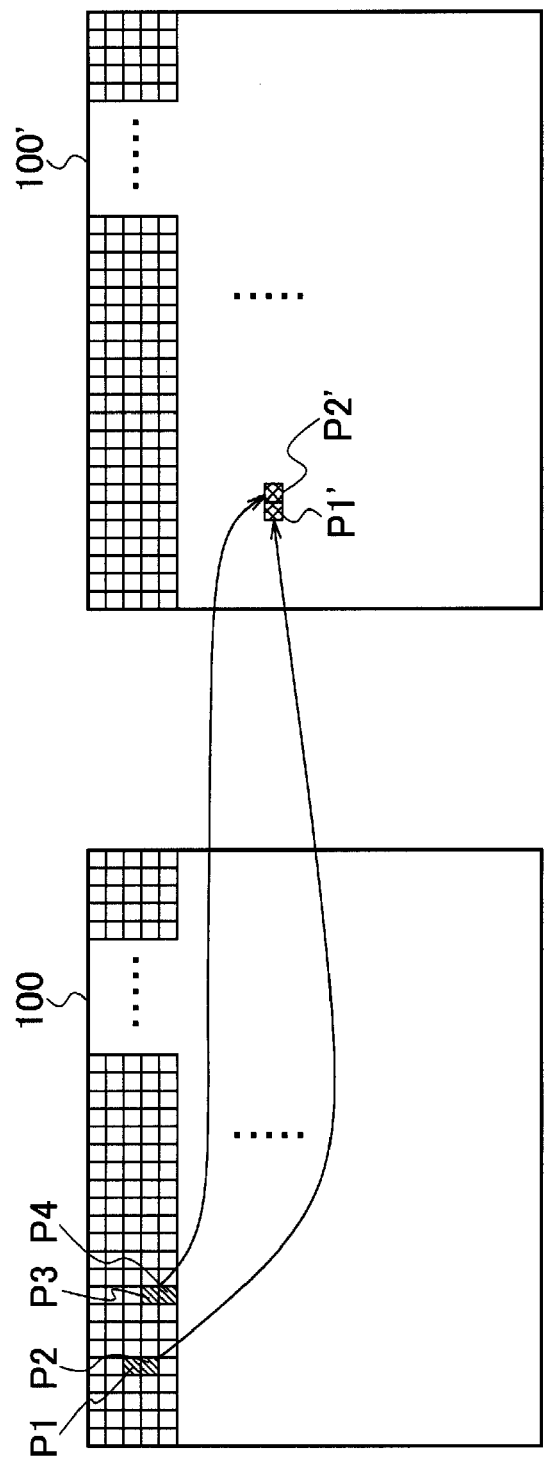

[Fig. 20]
(a)
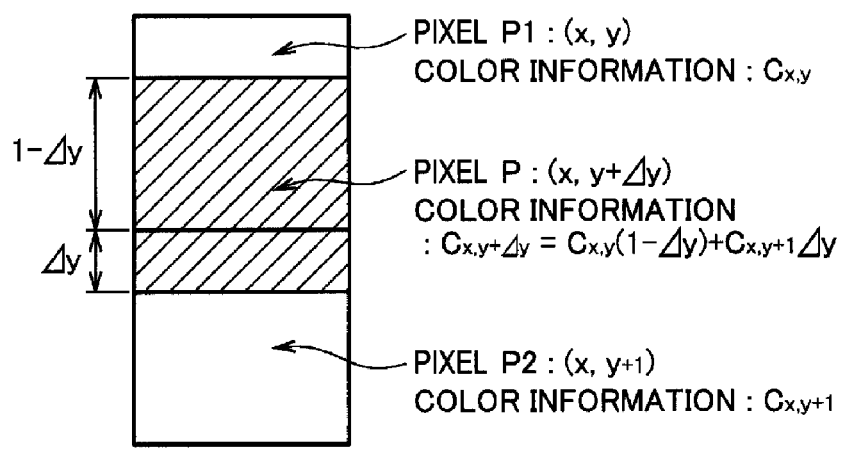
$1-\Delta y$
PIXEL P1 : (x, y)
COLOR INFORMATION : $C_{x,y}$
PIXEL P : (x, y+$\Delta$y)
COLOR INFORMATION
: $C_{x,y+\Delta y} = C_{x,y}(1-\Delta y)+C_{x,y+1}\Delta y$
$\Delta y$
PIXEL P2 : (x, y+1)
COLOR INFORMATION : $C_{x,y+1}$
(b)
PIXEL P' : (u, v)
 CORRESPONDING TO (x, y+$\Delta$y)
COLOR INFORMATION : $C_{u,v} = C_{x,y+\Delta y}$
 $= C_{x,y}(1-\Delta y)+C_{x,y+1}\Delta y$
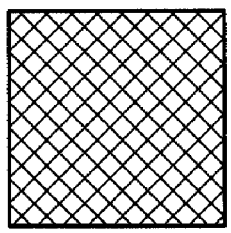

[Fig. 21]
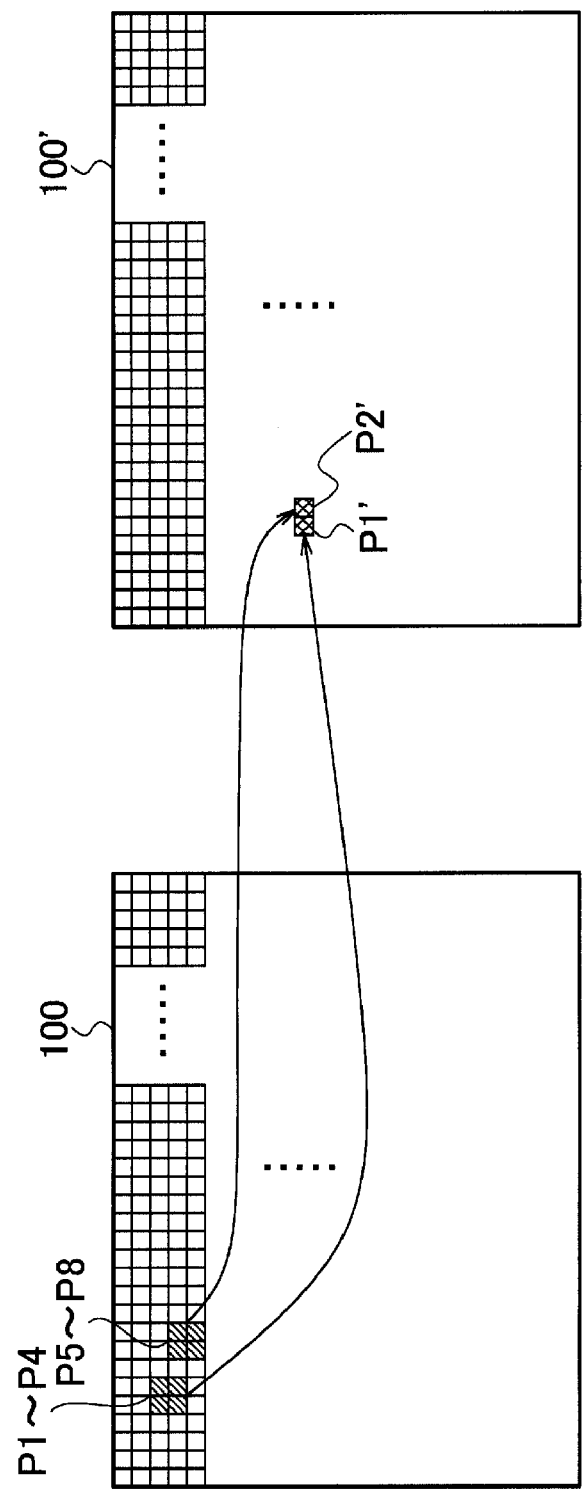

[Fig. 22]
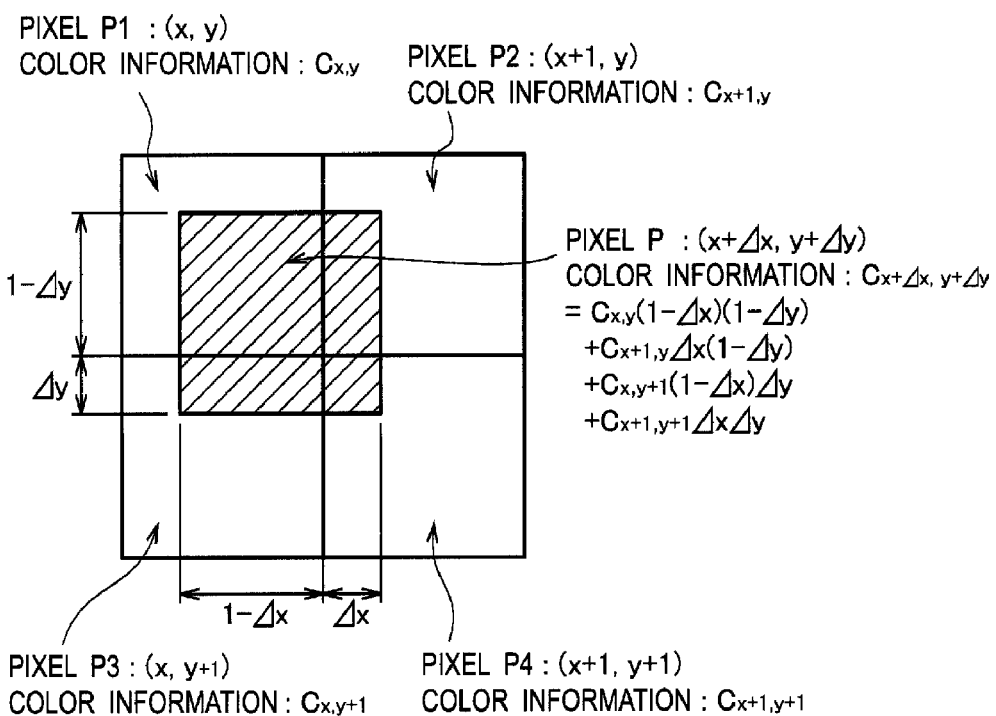
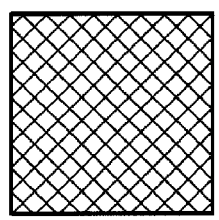

[Fig. 23]
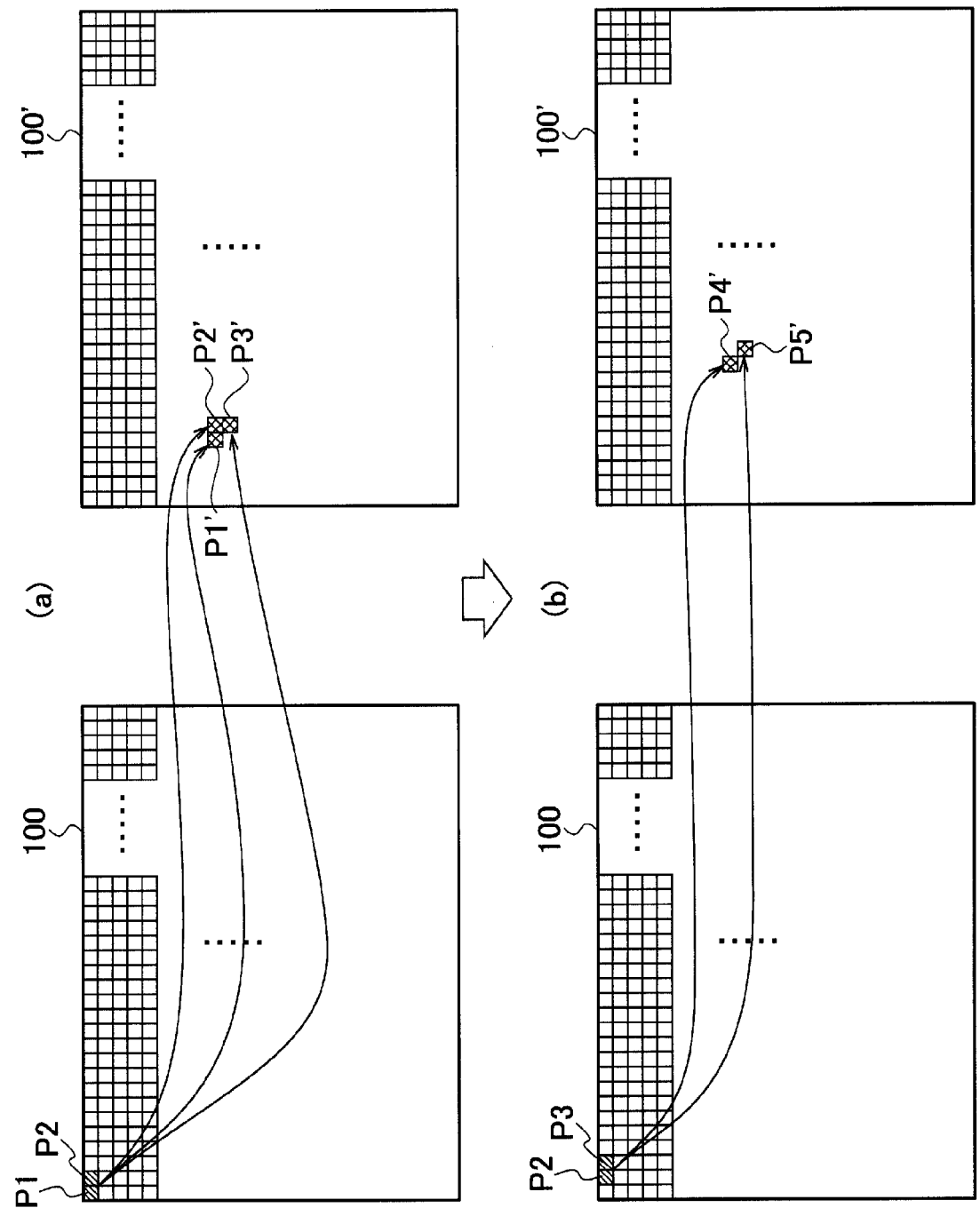

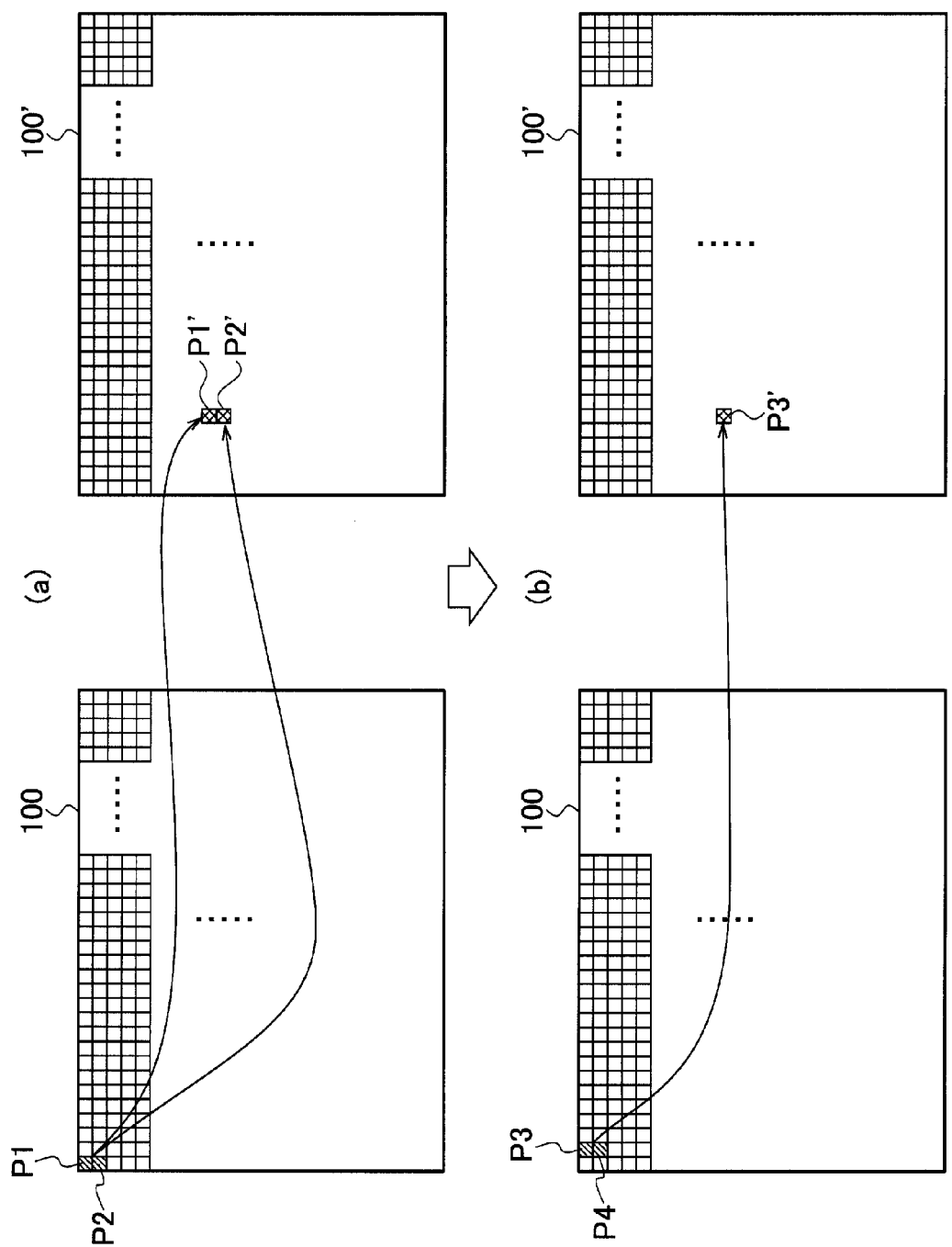
[Fig. 24]

[Fig. 25]
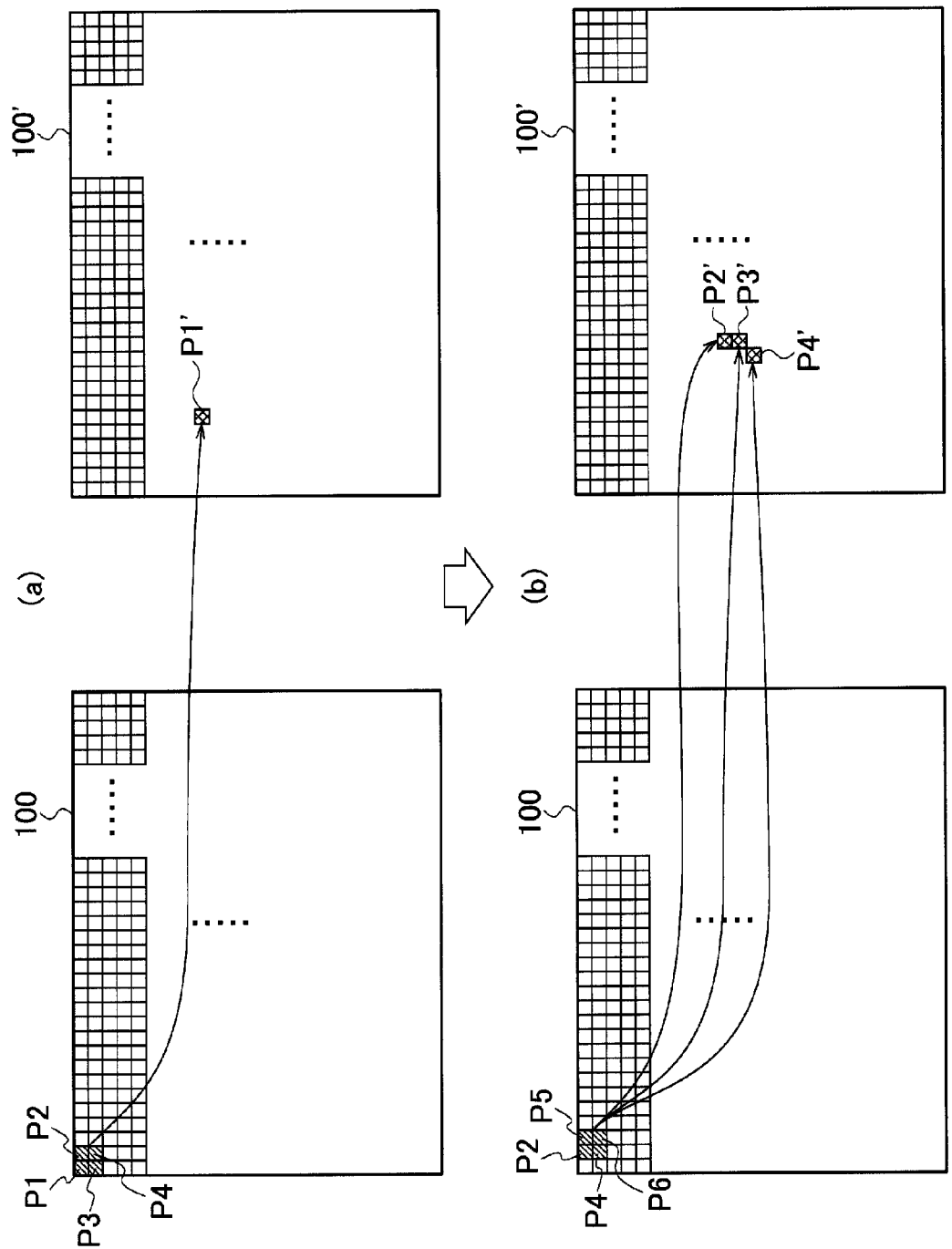

[Fig. 26]
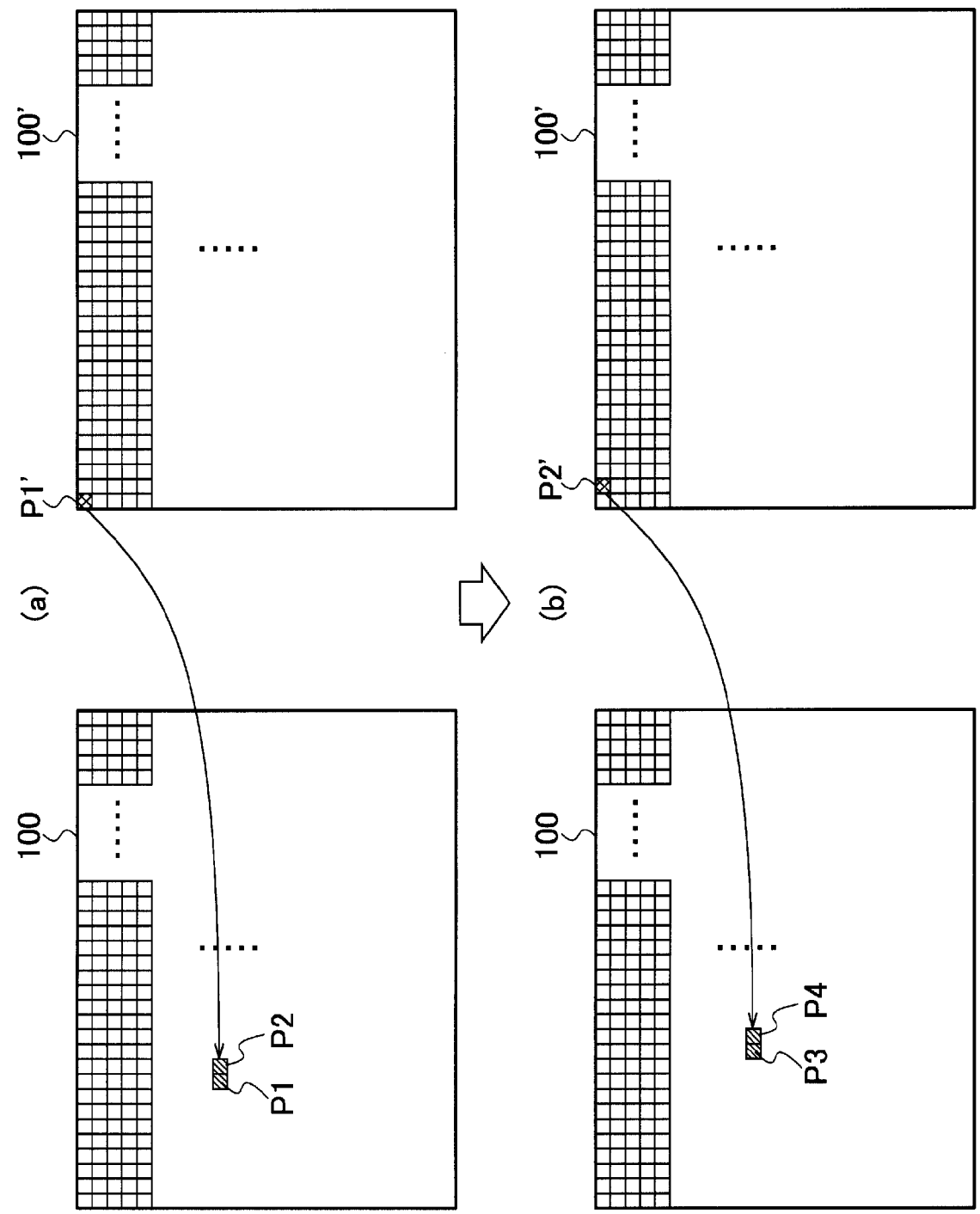

[Fig. 27]
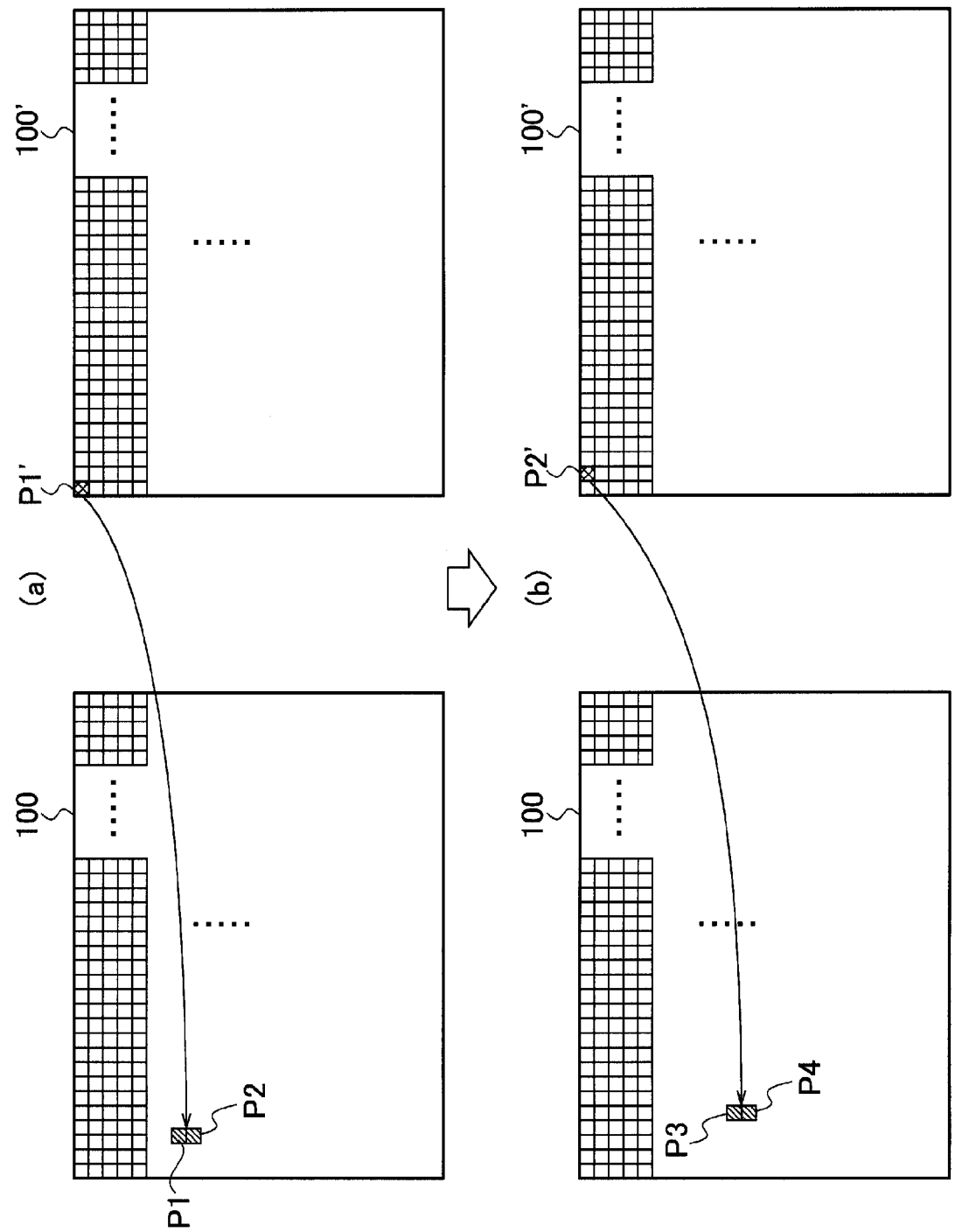

[Fig. 28]
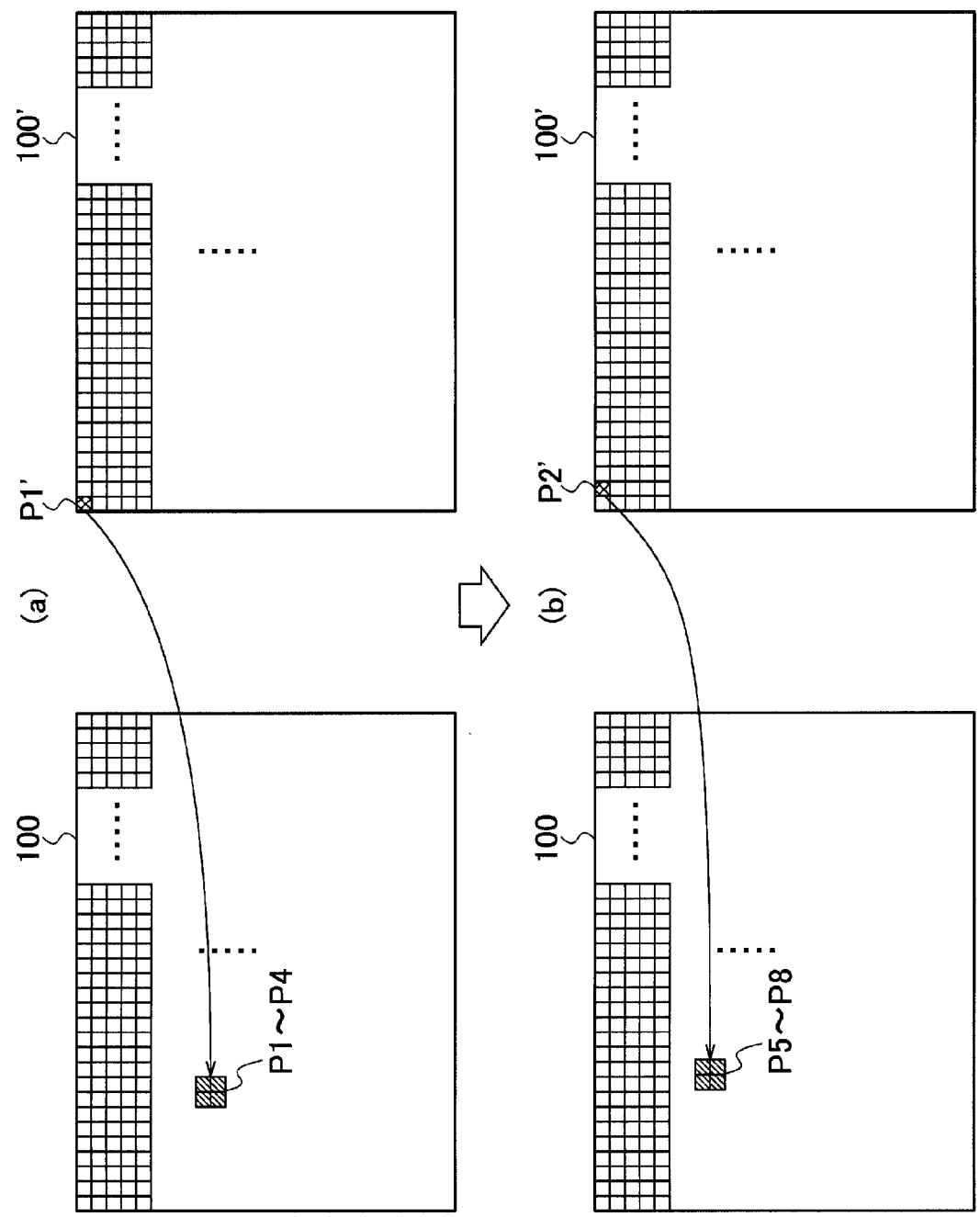

ized or required equipment with high specifications.

IMAGE SIGNAL PROCESSING APPARATUS AND VIRTUAL REALITY CREATING SYSTEM

TECHNICAL FIELD

The present invention relates to an image signal processing apparatus previously performing distortion correction for an input image signal so that a two-dimensional image signal can be displayed without distortion even if being projected onto a screen of arbitrary shape and relates to a virtual reality creating system.

BACKGROUND ART

A technique to project an image onto a screen of arbitrary shape without distortion has been already put into practice in virtual reality creating apparatuses. Examples of such a prior art include a following literature and the like. In these virtual reality creating apparatuses, an input image signal was a computer graphics signal or a DV signal generated for the virtual reality creating apparatus. Moreover, relational expressions for distortion correction used to project an image without distortion (description about a relation between images before and after the distortion correction and a distortion correction table) were created within the system.
Japanese Patent No. 3387487

DISCLOSURE OF INVENTION

Technical Problem

However, in the aforementioned technique, the image signal which was allowed to be inputted was limited, or three-dimensional calculation processing needed to be performed since the relational expressions for distortion correction were created in the same system, which complicated the system or required equipment with high specifications.

The present invention was therefore made in the light of the aforementioned circumstances, and an object of the present invention is to provide an image signal processing apparatus capable of performing easy distortion correction processing without performing complicated three-dimensional processing by using a result of externally carrying out the processing for distortion correction.

Technical Solution

The present invention is an image signal processing apparatus outputting to a projection unit an output image signal to project image light onto a projection plane of arbitrary shape and solves the aforementioned problems by including: an image signal input unit which receives a two-dimensional image signal to project image light onto a two-dimensional projection plane; an external input unit which externally receives a distortion correction table as a correspondence map between the two-dimensional projection plane and a mesh model of the projection plane of arbitrary shape, the distortion correction table being used to perform distortion correction processing for the two-dimensional image signal received by the image signal input unit; a distortion correction unit which performs distortion correction processing for each pixel of the two-dimensional image signal received by the image signal input unit with reference to the distortion correction table received by the external input unit to generate the output image signal to project the image light onto the projection plane; and an output unit which outputs the image signal generated by the distortion correction unit to the projection unit.

A virtual reality creating system according to the present invention includes: a screen including a projection plane of arbitrary shape with a concave surface faced to a viewer, the screen being capable of displaying an image wider than an effective angle of view of the viewer; an image signal processing apparatus performing distortion correction used for projecting image light onto the projection plane of arbitrary shape for a two-dimensional image signal to project image light onto a two-dimensional image light and then outputting an output image signal; an external processing apparatus which creates a distortion correction table as a correspondence map between the two-dimensional projection plane and a mesh model of the projection plane of arbitrary shape; and a projector unit which projects an image based on the output image signal outputted from the image signal processing apparatus onto the screen. In order to solve the aforementioned problems, the image signal processing apparatus is characterized by including: an image signal input unit which receives the two-dimensional image signal; an external input unit which receives a distortion correction table as a correspondence map between the two-dimensional projection plane and a mesh model of the projection plane of arbitrary shape, the distortion correction table being used to perform the distortion correction processing for the two-dimensional image signal received by the image signal input unit; a distortion correction unit which performs distortion correction processing for each pixel of the two-dimensional image signal received by the image signal input unit with reference to the distortion correction table received by the external input unit to generate the output image signal to project the image light onto the projection plane of arbitrary shape; and an output unit which outputs the output image signal generated by the distortion correction unit to the projection unit.

Advantageous Effects

According to the present invention, the distortion correction table is previously stored in the image signal processing apparatus from the outside, and the output image signal can be generated only by performing two-dimensional coordinate transformation when the distortion correction processing is performed for the two-dimensional image signal in projecting the image light onto the screen from the projection unit without performing three-dimensional processing. According to the present invention, therefore, it is possible to implement processing to reduce distortion of images viewed by the viewer with a simple structure.

BRIEF DESCRIPTION OF THE DRAWINGS

FIG. 1 is a block diagram showing a configuration of a virtual reality creating system to which the present invention is applied.

FIG. 2 is a block diagram showing a hardware configuration of a distortion correction unit to which the present invention is applied.

FIG. 3 is a block diagram showing a software configuration of a distortion correction unit to which the present invention is applied.

FIG. 4 is a view for explaining distortion correction processing using a distortion correction table, (a) being a two-dimensional image before the correction processing; and (b) being an output image after the correction processing.

FIG. 5 is a view for explaining brightness correction processing using a brightness correction table, (a) being a two-dimensional image before correction processing; (b) being an output image after the brightness correction processing; and (c) being an output image after brightness correction and distortion correction.

FIG. 6 is a view for explaining brightness correction processing using a brightness correction table, (a) being a two-dimensional image before correction processing; (b) being an output image after the brightness correction processing; and (c) being an output image after brightness correction and distortion correction.

FIG. 7 is a block diagram of a screen model creation block of a parameter adjusting personal computer.

FIG. 8 is a view showing sphere model and input parameters corresponded with the sphere model.

FIG. 9 is a view showing model cut a part of sphere surface and input parameters corresponded with the sphere model.

FIG. 10 is a view showing a front shape when cut a part of the spherical screen.

FIG. 11 is a view showing cylinder model and input parameters corresponded with the cylinder model.

FIG. 12 is a view showing input parameters of a plurality of planes.

FIG. 13 is a view for explaining the distortion correction processing for the spherical shape of the screen.

FIG. 14 is a view showing contents of the distortion correction processing.

FIG. 15 is a two-dimensional cross-sectional view of FIG. 4 cut at the center of a hemispherical screen.

FIG. 16 is an image view of distortion correction of a grid image.

FIG. 17 is an image view when color information of each pixel of an output image is created from two corresponding pixels of an input image which are adjacent in a direction x.

FIG. 18 is an explanatory view for calculation of the color information of the output image by mixing the color information of the two pixels of the input image which are adjacent in the direction x.

FIG. 19 is an image view when the color information of each pixel of the output image is created from corresponding two pixels of the input image in a direction y.

FIG. 20 is an explanatory view for calculation of the color information of the output image by mixing the color information of the two pixels of the input image which are adjacent in the direction y.

FIG. 21 is an image view when the color information of each pixel of the output image is created from corresponding four pixels of the input image which are adjacent in the directions x and y.

FIG. 22 is an explanatory view for calculation of the color information of the output image by mixing the color information of the four pixels of the input image which are adjacent in the directions x and y.

FIG. 23 is an explanatory view for the processing to convert the input image into the output image in an input order when the color information of each pixel of the output image is created from corresponding two pixels of the input image which are adjacent in the direction x, (a) being an explanatory view for processing after first pixels P1 and P2 of the input image are inputted; and (b) being an explanatory view at the time after a pixel P3 subsequent to the pixel P2 is inputted.

FIG. 24 is an explanatory view for the processing to convert the input image into the output image in the input order when the color information of each pixel of the output image is created from corresponding two pixels of the input image which are adjacent in the direction y, (a) being an explanatory view for processing after pixels P1 and P2 of the input image are inputted; and (b) being an explanatory view after a pixel P4 subsequent to the pixel P2 is inputted.

FIG. 25 is an explanatory view for the processing to convert the input image into the output image in the input order when the color information of each pixel of the output image is created from corresponding four pixels of the input image which are adjacent in the directions x and y, (a) being an explanatory view for processing after first pixels P1 to P4 of the input image are inputted; and (b) being an explanatory view after a pixel P6 subsequent to the pixel P4 is inputted.

FIG. 26 is an explanatory view for the processing to convert the input image into the output image in an output order when the color information of each pixel of the output image is created from corresponding two pixels of the input image which are adjacent of a first pixel P1' of the output image; and (b) being an explanatory view for generation of a pixel P2' subsequent to the first pixel P1'.

FIG. 27 is an explanatory view for the processing to convert the input image into the output image in the output order when the color information of each pixel of the output image is created from the corresponding two pixels of the input image which are adjacent in the direction y, (a) being an explanatory view for generation of a first pixel P1' of the output image; and (b) being an explanatory view for generation of a pixel P2' subsequent to the first pixel P1'.

FIG. 28 is an explanatory view for the processing to convert the input image into the output image in the output order when the color information of each pixel of the output image is created from the corresponding four pixels of the input image which are adjacent in the directions x and y, a) being an explanatory view for generation of a first pixel P1' of the output image; and (b) being an explanatory view for generation of a pixel P2' subsequent to the first pixel P1'.

EXPLANATION OF REFERENCE

1 SCREEN
2 IMAGE PROJECTION UNIT
3 DISTORTION CORRECTION UNIT
3h EXTERNAL OUTPUT TERMINAL
3a-3f IMAGE INPUT TERMINAL
3g, 3h EXTERNAL INPUT TERMINAL
5 PARAMETER ADJUSTING PC
6 OPERATION INPUT BLOCK
11 SIGNAL SYSTEM CONVERSION CIRCUIT
13 EXTERNAL DEVICE CONTROL CIRCUIT
12 IMAGE SIGNAL PROCESSING CIRCUIT
15 CALCULATION MEMORY
16 TABLE MEMORY
17 SIGNAL SYSTEM CONVERSION CIRCUIT
18 CONTROL SIGNAL MEMORY
21 INPUT IMAGE PROCESSING BLOCK
22 IMAGE SWITCHING/DIVIDING BLOCK
23 IMAGE COMPOSITION BLOCK
24 DISTORTION CORRECTION BLOCK
25 OUTPUT IMAGE PROCESSING BLOCK
26 SYNCHRONIZATION PROCESSING BLOCK
27 CONVERSION TABLE READING/STORING BLOCK
28 EXTERNAL DEVICE CONTROL BLOCK
29 CONTROL SIGNAL READING/STORING BLOCK
31 SPHERE
32 CYLINDER
33 COMPOSITE
34 MIXED WITH SPHERE
35 MIXED WITH CYLINDER
36 MIXED WITH PLANE
100 INPUT IMAGE
100' OUTPUT IMAGE

BEST MODE FOR CARRYING OUT THE INVENTION

Hereinafter, a description is given of embodiments of the present invention with reference to the drawings.

A virtual reality creating system which the present invention is applied projects an output image composed of right and left eye image light rays by means of an image projection unit 2, which includes two projectors 2a and 2b as projection units in order to project a three-dimensional image light onto a screen 1, which includes a projection plane of arbitrary shape with a concave surface faced to a viewer as shown in FIG. 1 and can display an image wider than an effective angle of view of the viewer, thus providing virtual reality to the viewer.

This virtual reality creating system includes a distortion correction unit 3 as an image signal processing apparatus, which is connected to the projectors 2a and 2b, an image generator 4, and a parameter adjusting personal computer 5. The distortion correction unit 3 performs image signal processing to correct image distortion caused when image light is projected onto the screen 1 with the projection plane of arbitrary shape and generate an output image signal. The parameter adjusting personal computer 5 does not need to be always connected to the distortion correction unit 3 and only needs to be connected only when outputting a distortion correction table, a brightness correction table, control signals, and the like to the distortion correction unit 3 as described later.

The screen 1 mirror-reflects the right and left eye image light rays from the projectors 2a and 2b. The shape of the projection plane of the screen 1 is a hemispherical shape using a part of a sphere, a cylindrical shape, and the like and may be a shape including a plurality of planes connected to each other.

The projectors 2a and 2b receive from the distortion correction unit 3 an output image signal including a right eye image signal and a left eye image signal in order to project the right and left eye image light rays. These projectors 2a and 2b are connected to image output terminals 3e, 3f of two channels of the distortion correction unit 3, respectively.

To offer the viewer with a stereoscopic view, for example, right and left eye polarization filters are attached to the projector 2a and 2b, respectively; the screen 1 is a so-called silver screen; and the viewer wears polarization glasses corresponding to the polarization filters. The projector unit does not need to include the two projectors. The projector unit may be configured to alternately project the right and left eye image light rays from a single projector in a time-division manner.

The image generator 4 includes a storage medium storing an image signal for projecting the two-dimensional image light. The image generator 4 is a personal computer, an image reproducing apparatus such as a videocassette recorder and a DVD recorder, a video camera, a stereoscopic camera, or the like. The image generator 4 includes output terminals for four channels, which are connected to image input terminals 3a to 3d for one to four channels of the distortion correction unit 3. In the example shown in FIGS. 1 to 3, a configuration with four input channels and two output channels is shown. However, each number of the input and output channels may be one.

The parameter adjusting personal computer 5 creates a distortion correction table used to perform distortion correction for the two-dimensional image signal in the distortion correction unit 3 according to the curve shape of the screen 1 and a brightness correction table used to perform the brightness correction for the two-dimensional image signal and then supplies the tables to the distortion correction unit 3.

This distortion correction table is a correspondence map between a two-dimensional projection plane and a mesh model of a projection plane of arbitrary shape. This distortion correction table may be a table describing pixels of the input image before the distortion correction corresponding to pixels of the output image after the distortion correction and describes the shift amounts from the individual pixels so as to allow mixing of color information of a plurality of pixels of the input image in a proper ratio and create the color information of a pixel of the output image. Moreover, the brightness correction table is a table describing how many times higher brightness each pixel of the two-dimensional image signal before the distortion correction processing or the output image signal after the distortion correction processing is set to.

The distortion correction table describing only the correspondence map between the two-dimensional projection plane and the mesh model of the projection plane of arbitrary shape relates, for example, pixel coordinates (5, 7) of the input image to pixel coordinate (6, 8) of the output image. The distortion correction table capable of creating the color information of a pixel of the output image from the color information of a plurality of pixels of the input image relates, for example, pixel coordinates (5.55, 7.3) of the input image to pixel coordinates (6, 8) of the output image when there are shift amounts of 0.55 in the direction x and 0.3 in the direction y.

The distortion correction unit 3 includes an external input terminal 3g, which is connected to the parameter adjusting personal computer 5, and receives the distortion correction table and brightness correction table. The processing to create the distortion correction table by the parameter adjusting personal computer 5 is described later.

The parameter adjusting personal computer 5 outputs to the distortion correction unit 3 a control signal to control operations of the projectors 2a and 2b. This control signal includes all kinds of control commands for the projectors 2a and 2b such as commands to start and stop an output of image light of the projector 2a and 2b and image projection positions, image size, zoom factors, and color adjustment of the projectors 2a and 2b. This control signal is received by the distortion correction unit 3 and supplied to the projectors 2a and 2b through the external output terminal 3h of the distortion correction unit 3.

The distortion correction unit 3, whose hardware configuration is shown in FIG. 2, includes a signal system conversion circuit 11 on an image input side, an image signal processing circuit 12, an external device control circuit 13, a digital signal processor (DSP) 14, a calculation memory 15, a table memory 16, a signal system conversion circuit 17 on an image output side, and a control signal memory 18. The distortion correction unit 3 including such a hardware configuration, whose functional software configuration is shown in FIG. 3, includes an input image processing block 21, an image switching/dividing block 22, an image composition block 23, a distortion correction block 24, an output image processing block 25, a synchronization processing block 26, a conversion table reading/storing block 27, an external device control block 28, a control signal reading/storing block 29.

The signal system conversion circuit 11 functions as the input image processing block 21, which receives an image from the image generator 4 through the image input terminals 3a to 3d. This signal system conversion circuit 11 receives a composite signal, a separate signal, a component signal, a digital video signal, and the like as the two-dimensional image signal from the image generator 4. In the case of such a structure which can receive several kinds of two-dimensional image signals, the image input terminals 3*a* to 3*d* are a DVI-I terminal, a RGB terminal, a S terminal, a composite terminal, a D terminal, and the like, each having a terminal shape supporting each signal system. By allowing all kinds of two-dimensional image signals to be inputted in this manner, the kinds of two-dimensional image signals inputted are increased. Upon reception of the two-dimensional image signal through the image input terminal 3*a*, 3*b*, 3*c*, or 3*d*, the signal system conversion circuit 11 converts the system of the two-dimensional image signal into a system which can be processed by the image signal processing circuit 12 and the like and outputs the same to the image signal processing circuit 12.

The image signal processing circuit 12 includes an image switching/dividing circuit serving as the image switching/dividing block 22 in FIG. 3, an image composition circuit serving as the image composition block 23, an image correction circuit serving as the distortion correction block 24, and a synchronization processing circuit serving as the synchronization processing block 26. This image signal processing circuit 12 switches or divides the two-dimensional image signals from the input image processing block 21 by the image switching/dividing block 22 and performs image composition in the image composition block 23 in the case of composing a plurality of two-dimensional image signals and supplies the same to the distortion correction block 24.

The distortion correction block 24, with reference to the distortion correction table previously stored in the conversion table reading/storing block 27, performs coordinate transformation on a pixel basis to convert the two-dimensional image signal into the output image signal for distortion correction processing. Moreover, the distortion correction block 24, with reference to the brightness correction table previously stored in the conversion table reading/storing block 27, changes a brightness value of each pixel to convert the two-dimensional image signal into the output image signal for brightness correction processing. Furthermore, the distortion correction block 24 can create color information of each pixel of the output image based on color information of a plurality of pixels of the input image related to the pixel of the output image by referring the shift amounts described in the distortion correction table in the coordinate transformation of the distortion correction processing. In the distortion correction processing and brightness correction processing, the image signal processing circuit 12 (distortion correction block 24) uses the calculation memory 15 as a work area.

The distortion correction processing by this distortion correction block 24 converts pixels a, b, and c of a two-dimensional image signal show in FIG. 4(*a*) into pixels a', b', and c' of an output image signal 100' shown in FIG. 4(*b*) for distortion correction. This output image signal 100' is a result of coordinate transformation according to the mesh model of the screen 1 having a projection plane of arbitrary shape.

The brightness correction processing by the distortion correction block 24 is processing shown in FIG. 5 when the brightness correction table supporting the output image signal after the distortion correction processing is stored in the conversion table reading/storing block 27. Specifically, first, the brightness correction processing is performed for the two-dimensional image signal 100 shown in FIG. 5(*a*) to generate the two-dimensional image signal 100', and then the distortion correction processing is performed for the two-dimensional image signal 100'.

The brightness correction processing is processing shown in FIG. 6 when the brightness correction table supporting the two-dimensional image signal before the distortion correction processing, is stored in the conversion table reading/storing section 27. Specifically, in an output image signal 100' of FIG. 6(*b*), which is a result of the distortion correction processing performed for the two-dimensional image signal 100 shown in FIG. 6(*a*), brightness of pixels a', b', and c' after the distortion correction is changed to obtain new pixels a'', b'', and c'' after the brightness correction shown in FIG. 6(*c*), respectively. The distortion correction processing of the distortion correction block 24 can create the color information of a pixel of the output image in the coordinate conversion for the distortion correction processing based on the color information of a plurality of pixels of the input image related to the pixel of the output image by referring to the shift amount described in the distortion correction table. Details of the distortion correction processing including the processing to interpolate and create the color information of pixels of the output image are described later.

The output image signal which has been subjected to the distortion and brightness correction processing by this distortion correction block 24 is transferred to the output image processing block 25 (the signal system conversion circuit 17) and supplied from the output image processing block 25 to the projectors 2*a* and 2*b*. At this time, the output image processing block 25 (the signal system conversion circuit 17) converts the output image signal into such a signal system that allows the projectors 2*a* and 2*b* to project an image and then outputs the same. The image output terminals 3*e* and 3*d* are DVI-I terminals, RGB terminals, or the like, which have terminal shape supporting the system of the output image signal.

In this distortion correction unit 3, the synchronization processing block 26 controls timing of processing the image signal and timing of transferring the image signal of the input image processing block 21, image switching/dividing block 22, image composition block 23, distortion correction block 24, and output image processing block 25 in order to allow each block to operate in real time. In this distortion correction unit 3, software processing of the image signal processing circuit 12 is controlled by the digital signal processor 14.

Furthermore, in the distortion correction unit 3, the control signal reading/storing block 29 receives and stores control signals supplied from the parameter adjusting personal computer 5, and the external device control circuit 13 (the external device control block 28) properly selects a control signal from the control signal reading/storing block 29 and transfers the selected control signal to the projectors 2*a* and 2*b* through the external output terminal 3*h*. The control signal which the distortion correction unit 3 sends to the projectors 2*a* and 2*b* may be outputted from the external device control block 28 as shown in FIG. 3 in response to an operation input signal from the operation input unit 6 such as a press button or a remote controller operated by a user. This allows the user to control the projectors 2*a* and 2*b* while switching the control signals stored in the control signal reading/storing block 29.

With the distortion correction unit 3, as described above, the output image signal can be created without three-dimensional processing only by previously storing the distortion and brightness correction tables in the conversion table reading/storing block 27 and performing two-dimensional coordinate conversion and brightness conversion in the distortion and brightness correction processing performed for the two-dimensional image signal when projecting image light from the projectors 2*a* and 2*b* to the screen 1. Specifically, the relational expressions for distortion correction can be generated by the parameter adjusting personal computer 5, which is externally provided, and the thus-obtained processing result of the parameter adjusting personal computer 5 can be inputted as the distortion correction table. Accordingly, in the distortion correction unit 3, the distortion correction can be carried out only by two-dimensional calculation without the need for three-dimensional calculation. According to the distortion correction unit 3, therefore, processing to reduce distortion of an image viewed by a viewer can be realized in real time with a simple structure.

Moreover, according to this distortion correction unit 3, the aforementioned processing can be performed for various kinds of image signals, thus reducing the limitation on the kinds of input images.

Furthermore, the distortion correction unit 3 is configured to simultaneously receive a plurality of two-dimensional image signals and simultaneously output a plurality of image signals. When simultaneously receiving a plurality of two-dimensional image signals, the image signal processing circuit 12 can select some of the plurality of two-dimensional image signals and perform distortion correction for the same to output an output image signal to the signal system conversion circuit 17. The plurality of two-dimensional image signals can be composed and outputted from the signal system conversion circuit 17. The condition for selecting output image signals to be outputted to the signal system conversion circuit 17 among the plurality of two-dimensional image signals can be set by the parameter adjusting personal computer 5. Moreover, it is desirable to perform image resizing to equalize image size of the plurality of two-dimensional image signals.

Moreover, when a plurality of two-dimensional image signals are simultaneously inputted, the plurality of two-dimensional image signals can be synchronized in processing timing by the synchronization processing block 26 composed of the DSP 14. This can provide a stereoscopic view using the two projectors 2a and 2b.

Furthermore, using a plurality of two-dimensional image signals, the aforementioned image signal processing circuit 12 may generate a disparity two-dimensional image signal by combining the plurality of two-dimensional image signals with disparities provided thereamong. In the case of a three-channel input, a two-dimensional image signal of a channel 3 may be combined with two-dimensional image signals of channels 1 and 2 with disparities provided between the two-dimensional image signal of the channel 3 and the two-dimensional image signals of channels 1 and 2. In the case of a four-channel input, disparity two-dimensional image signals may be generated by combining a two-dimensional image signal of the channel 3 with a two-dimensional image signal of the channel 1 with a disparity provided therebetween and combining the channel 4 with a two-dimensional image signal of the channel 1 with a disparity provided therebetween. The condition in such processing to generate the disparity two-dimensional image signal can be set by the parameter adjusting personal computer 5, and such settings can display a stereoscopic image without distortion on the screen 1.

Next a description is given of the processing of the parameter adjusting personal computer 5 to create the distortion correction table in a virtual reality creating system configured as described above.

The parameter adjusting personal computer 5 mainly includes the screen model creation block, a projector arrangement/setup block, a user position setting block as functions of a table creating/outputting block related to the distortion correction table. The screen model creation block creates a mesh model of the screen 1 as shown in FIG. 7. This screen model creation block initially stores basic three models, which are a sphere model 31, a cylinder model 32, and a mixture model 33. The mixture model 33 includes a sphere mixed model 34 mainly composed of a sphere mixed with another plane or curved surface, a cylinder mixed model 35 mainly composed of a cylinder mixed with another plane or curved surface, and a plane mixed model 36 mainly composed of a plane mixed with another plane or curved surface. As for each of the models 31, 32, and 34 to 36, any one of these models is selected, and input parameters 31a, 32a, and 34a to 36a are inputted to create mesh models 31b, 32b, and 34b to 36b suitable for the actual screen 1, respectively. The basic models stored in the screen model creation block are not limited to the models 31 to 33 shown in FIG. 7, and it is possible to set an ellipse model, a rectangle model, and the like in addition to the models 31 to 33 and perform the input of the input parameters and creation of the mesh model. It is therefore possible to create such a distortion correction table that does not cause distortion in an image projected onto the screen 1 even if the screen 1 is elliptic, rectangular, or a combination of ellipses and rectangles.

The basic models and input parameters are as follows.

When the screen 1 is a spherical surface (a part of a sphere), as shown in FIG. 8, the input parameters are a radius R of the sphere model and a distance A between the center of the sphere model and a section.

Herein, the sphere model is expressed by Equation 1.

$$x^2+y^2+Z^2=R^2 \quad \text{(Equation 1)}$$

Herein, $A<=x<=R$, $-y1<=y<=y1$, and $-z1<=z<=z1$. y1 is obtained by substituting into the equation 1 for x=A and z=0; and z1 is obtained by substituting into the equation 1 for z=A and y=0, resulting in y1=z1. Accordingly, when the screen 1 is spherical surface as described above, as the input parameters to the parameter adjusting personal computer 5, only the radius R of the sphere model and the distance A between the center of the sphere model to the section need to be inputted.

As shown in FIG. 10, when the shape of screen 1 from an anterior view is the sphere screen of cutting a part of sphere screen from any end on the left, right, top and bottom to inside, the sphere model corresponded with the screen 1 is expressed as follows. For example, when the screen 1 is the sphere screen cut from the end of the bottom in an anterior view shown in FIG. 10(*a*), the sphere model corresponded with the screen 1 is expressed as the Equation 1, $A<=x<=R$, $-B<=y<=y1$, and $-z1<=z<=z1$ in shown FIG. 9. y1 is obtained by substituting into the equation 1 for x=A and z=0; z1 is obtained by substituting into the equation 1 for x=A and y=0; and x1 is obtained by substituting into the equation 1 for y=−B and z=0. Accordingly, in the case of the screen 1 as described above, as the input parameters to the parameter adjusting personal computer 5, only the radius R of the sphere model, the distance A between the center of the sphere model and the section, and the distance B between the center of sphere model and the cutting position of sphere screen need to be inputted.

In similar way, when the screen 1 is the sphere screen cut from the end of the top, left, right in an anterior view shown in FIG. 10(*b*), FIG. 10(*c*), FIG. 10(*d*), each sphere model is expressed as follows. As shown FIG. 10(*b*), in case of sphere screen cut from the end of top, the sphere model is represented as the Equation 1, $A<=x<=R$, $-y<=y<=B$, and $-z1<=z<=z1$. As shown FIG. 10(*c*), in case of sphere screen cut from the end of right, the sphere model is represented as the Equation 1, $A<=x<=R$, $-y<=y<=y1$, and $-z<=z<=B$. As shown FIG. 10(*d*), in case of sphere screen cut from the end of left, the sphere model is represented as the Equation 1, $A<=x<=R$, $-y<=y<=y1$, and $-B<=z<=z1$. Accordingly, as the input parameters to the parameter adjusting personal computer 5, only the radius R of the sphere model, the distance A between the center of the sphere model and the section, and the distance B between the center of sphere model and the cutting position need to be inputted. Moreover, The parameter adjusting personal computer 5 may create the screen model of the screen including a combination of two or more cutting places if the number of input parameters to the parameter adjusting personal computer 5 is increased.

On the other hand, when the screen 1 is the arched screen cut a circular cylinder, the screen model is represented cylinder model shown in FIG. 11. The circle of the cylinder model on the section of x-y plane shown in FIG. 11 is expressed by the Equation 2.

$$x^2+Z^2=R^2 \quad \text{(Equation 2)}$$

Herein, the equation of the surface of the cylinder model is obtained by applying limitations of A<=x<=R, 0<y<=H, and −z1<=z<=z1. Accordingly, the input parameters to the parameter adjusting personal computer 5 are the radius R of the circle (radius R of arched screen), the distance A between the center of the circle and the section, and height H (height of arched screen).

Furthermore, FIG. 12(*a*) shows a case of the screen 1 with a projection plane composed of a plurality of planes (including a plurality of rectangular surfaces). In this case, the input parameters to the parameter adjusting personal computer 5 are positions of the surfaces in a top view shown in FIG. 12(*b*) and a height H of the surfaces. In the case of FIG. 12(*b*), $$Z=-x+1(0<=x<1) \quad \text{(Equation 3-1)}$$

$$Z=0(1<=x<3) \quad \text{(Equation 3-2)}$$

$$Z=x-3(3<=x<=4) \quad \text{(Equation 3-3)}$$

$$0<y\leq=H \quad \text{(Equation 3-4)}$$

Moreover, in the case of the screen 1 composed a plurality of spherical surfaces combined a plurality of spherical surfaces horizontally arranged, the input parameters to the parameter adjusting personal computer 5 only need to be, similar to the examples shown in FIGS. 8 to 9, the radius R, the distance A to the section, the distance B to the cutting position, and the number of spherical surfaces horizontally arranged. Specifically, for example, the screen 1 including two spherical screens vertically arranged can be implemented by combining FIGS. 10(*a*) and 10(*b*), and similarly, the screen 1 including two spherical screens vertically arranged can be implemented by combining FIGS. 10(*a*) and 10(*b*). It is therefore understood that as the input parameters to the parameter adjusting personal computer 5, only the radius R, distance A to the section, distance B to the cutting position, and number of spherical surfaces horizontally arranged need to be inputted as previously described.

In the case of the screen 1 composed of a plurality of cylindrical surfaces, only the height H of the surfaces, the radius R and distance A of each portion of screen 1, and the number of the surfaces need to be inputted in addition to the top arrangement view. The functional expression of the projection plane of the screen 1 is determined in such a manner, and the shape of the projection plane of the screen 1 can be specified by substituting x, y, and z for proper values and recording a certain number of points on the screen 1 or more as sampling points. The functional expression of the projection plane of each type of the screen 1 is stored in each of the models 31, 32, and 34 to 36 in advance in the screen model creation block and can be called up for setting the distortion correction table. Only by inputting the aforementioned parameters as the input parameters 31*a*, 32*a*, 34*a* to 36*a*, the mesh models 31*b*, 32*b*, and 34*b* to 36*b* suitable for the actual screen 1 can be created by the parameter adjusting personal computer 5, respectively.

The sampling points on the projection plane of the screen 1 can be rotated around the axes x, y, and z (the screen 1 can be defined to be tilted).

Specifically, rotation around the axis x at alpha degree is expressed by Equation 4.

$$\begin{pmatrix} X \\ Y \\ Z \end{pmatrix} = \begin{pmatrix} 1 & 0 & 0 \\ 0 & \cos\alpha & -\sin\alpha \\ 0 & \sin\alpha & \cos\alpha \end{pmatrix} \begin{pmatrix} X \\ Y \\ Z \end{pmatrix} \quad \text{(Equation 4)}$$

Moreover, rotation around the axis y at beta degree is expressed by Equation 5.

$$\begin{pmatrix} X \\ Y \\ Z \end{pmatrix} = \begin{pmatrix} \cos\beta & 0 & \sin\beta \\ 0 & 1 & 0 \\ -\sin\beta & 0 & \cos\beta \end{pmatrix} \begin{pmatrix} X \\ Y \\ Z \end{pmatrix} \quad \text{(Equation 5)}$$

Moreover, rotation around the axis z at gamma degree is expressed by Equation 6.

$$\begin{pmatrix} X \\ Y \\ Z \end{pmatrix} = \begin{pmatrix} \cos\gamma & -\sin\gamma & 0 \\ \sin\gamma & \cos\gamma & 0 \\ 0 & 0 & 1 \end{pmatrix} \begin{pmatrix} X \\ Y \\ Z \end{pmatrix} \quad \text{(Equation 6)}$$

The parameter adjusting personal computer 5 creates a correspondence map which maps the thus-obtained sampling points on the projection plane of the screen 1 to individual sampling points of the two-dimensional image signal inputted to the distortion correction unit 3, thus allowing the distortion correction unit 3 to perform the distortion correction processing. The pixels of the two-dimensional image signal are assigned to individual corresponding pixels in the distortion correction table, thus generating an output image signal subjected to the distortion correction processing.

Once the shape of the projection plane of the screen 1 for use is determined and the parameters to the parameter adjusting personal computer 5 are inputted to create the distortion correction table, the distortion correction table does not need to be modified while there is no change in the parameters and the like. The distortion correction table is therefore supplied to the distortion correction unit 3 and stored in the distortion correction unit 3.

The above description using FIG. 8 to 12 is about causing the distortion correction unit 3 to perform the distortion correction processing for the shape of the projection plane of the screen 1 shown in FIG. 13. Specifically, if the two-dimensional image signal for the two-dimensional projection plane is projected onto the spherical screen 1 without modification, a distorted image is displayed as shown in FIG. 13(*a*). Accordingly, an output image signal previously distorted as shown in FIG. 13(*b*) is generated so that an image projected on the spherical screen 1 does not include distortion. However, further distortion correction is required because of variations in position relative to the screen 1 where the projector 2*a* and 2*b* are disposed, variations in positions of the viewer relative to the screen 1, and the like. Accordingly, the distortion correction table obtained as described above can be subjected to such correction.

The following description is given of processing to create a distortion correction table for the variations in relative positions of the projectors 2a and 2b and the viewer to the screen 1 with a spherical projection plane. This processing is performed by the parameter adjusting personal computer 5 in response to inputs from the projector arrangement/setup block and user position setting block.

FIG. 14 is a view for explaining a distortion correction method including correction of the positions of the projectors 2a and 2b and viewer in addition to the aforementioned spherical correction. First for correction, as shown in FIG. 14, a view frustum and an image projection frustum are defined based on a viewing position of the viewer and the projection positions of the projectors 2a and 2b, respectively. The view frustum is represented by a quadrangular pyramid with the apex at P0 as the viewing position and the base defined by P0,0, Pm, n, Pm,0. The projection frustum is represented with the apex at Q0 as a projector back focus position and the base defined by Q0,0, Qm,0, Qm, n, and Q0,n. Herein, m and n indicate image resolutions, which are 1279 and 1023, respectively, when the image signal is, for example, SXGA. The base is referred to as a virtual screen face.

Herein, for easy representation, an image viewed from a y-z two-dimensional section at m=i is shown in FIG. 15. First, a point Pi, j is assumed within a virtual screen face 1a, and an intersection Ri, j of a vector P0Pi,j and the screen 1 of dome type (the mesh models 31b, 32b, 34b to 36b) is calculated. As i and j are varied within 0<=i<=m and 0<=j<=n, a Pi, j–>Qi,j correspondence map can be created. This correspondence map serves as reverse correction for distortion of the image.

Specifically, the distortion correction is implemented by first performing normal image generation based on the view frustum; and then fetching data of this image and applying texture mapping coordinates using the Pi,j–>Qi,j correspondence map to the same for image generation again. An image composed of a grid image to which the Pi,j–>Qi,j correspondence map is applied is shown in FIG. 16 (which is inverse to FIG. 13(b)). This distortion correction processing does not limit the shape of the projection plane of the screen 1. Accordingly, the distortion correction processing is applicable to not only the sphere mesh model 31b obtained as previously described but also the other mesh models 32b, 34b to 36b, and the like.

As described above, by using the distortion correction table for the distortion correction processing by the parameter adjusting personal computer 5, image light can be projected from the projectors 2a and 3b while the distortion correction processing is successively performed for the two-dimensional image signal used for a two-dimensional display surface. It is therefore possible to display an image without distortion on the screen 1 of arbitrary shape.

Next, a description is given of the aforementioned processing to create the color information of a pixel of the output image based on the color information of a plurality of pixels of the input image related to the pixel of the output image in the coordinate transformation for the distortion correction processing with reference to the shift amount described in the distortion correction table (color information interpolating distortion correction processing). This color information interpolating distortion correction processing is not necessarily performed. However, the color information interpolating distortion correction processing can provide an output image with less jaggies than that obtained when only performing the distortion correction processing.

When performing the distortion correction processing to convert the two-dimensional image signal into the output image signal according to the distortion correction table, the distortion correction block 24 mixes color information of a plurality of pixels before conversion in a ratio corresponding to shift amount from representative point of pixel before the conversion to representative point of pixel after the conversion, performed according to the distortion conversion table. Next, the distortion correction block 24 generates the output image signal with the mixed color information as the color information of pixel after conversion of each pixel. Specifically, the distortion correction block 24 generates the output image signal either by first process or second process. The first process is that mixing color information of at least two pixels adjacent in an X-axis direction before the conversion according to position of the representative point of the pixel after the conversion relative to at least the two pixels. The second process is that mixing color information of at least two pixels adjacent in a Y-axis direction before the conversion according to position of the representative point of the pixel after the conversion relative to at least the two pixels.

Herein, the correspondence map, which maps the sampling points on the projection plane of the screen 1 to the sampling points of the two-dimensional image signal, is previously stored in the conversion table reading/storing block 27 as the distortion correction table. When each pixel of the two-dimensional image signal is related to a pixel of the output image signal in assignment of pixels of the two-dimensional image signal to pixels corresponding thereto in the distortion correction table, the output image after the conversion sometimes shows stairstepped uneven color, or so-called jaggies. This is because each pixel has a definite size determined depending on the image resolution, which causes an error corresponding to rounding of the coordinate position. The rounding error occurs because the representative point of a pixel before the conversion, for example, the center position of the pixel, corresponds to a position apart from the representative point of the pixel after the conversion. Accordingly, the color information of the output image signal is interpolated using the color information of pixels adjacent in the two-dimensional image signal in a ratio corresponding to the shift amount. The jaggies occurring in the output image signal can be therefore reduced.

For example, in the case where there is a shift in the direction x, in converting pixels P1 and P2 of a two-dimensional image signal (hereinafter, referred to as an input image 100), which are adjacent in the direction x, into a pixel P1' of an output image signal (hereinafter, referred to an output image 100') and converting pixels P3 and P4 of the input image 100, which are adjacent in the direction x, into a pixel P2' of the output image 100', as shown in FIG. 17, the color information of the pixel P1' of the output image 100' is created using the color information of the pixels P1 and P2, which are adjacent in the direction x, and the color information of the pixel P2' of the output image 100' is created using the color information of the pixels P3 and P4 of the input image 100, which are adjacent in the direction x.

A shift amount DELTAx in the direction x is represented by a value of 0 or more and less than 1, and the shift amount of 0 or 1 represents that the representative position of a pixel of the input signal matches the representative position of any one of the adjacent pixels. Specifically, in converting two pixels of the input image 100 adjacent in the direction x into a single pixel in the output image 100', when the shift amount DELTAx is provided between the input image 100 and the output image 100', as shown in FIG. 18(a), the color information of the pixel P1(x, y) of the input image and the color information of the adjacent pixel P2(x+1, y) are averaged in a ratio of 1-DELTAx/DELTAx to obtain color information $C_{x+DELTAx,y} = C_{x,y}(1-DELTAx) + C_{x-1,y} DELTAx$ of a virtual pixel P(x+DELTAx, y) as the color information of a pixel of the output image 100'. As shown in FIG. 18(*b*), the color information of a pixel P'(u, v) of the output image 100' after the conversion corresponding to the virtual input pixel (x+DELTAx, y) can be obtained as:

$$C_{x+DELTAx,y} = C_{x,y}(1-DELTAx) + C_{x+1,y}DELTAx$$

In such a manner, in order to generate the output image 100' by performing the color information interpolating distortion correction processing using two pixels in the direction x when there is a shift between the input image 100 and the output image 100' in the direction x, the distortion correction unit 3 previously stores the distortion correction table including description about the shift amounts in the conversion table reading/storing block 27. As shown in FIG. 17, the distortion correction block 24 generates each of the pixels P1' and P2' of the output image 100' from two pixels of the input image 100 in the direction x. Accordingly, the pixel of the output image 100' is calculated according to in what ratio the color information of two pixels of the input image 100 affects the color information of the pixel of the output image 100'.

Herein, it is assumed that a pixel of the input image 100 corresponding to a pixel (u, v) of the output image 100' is shifted from a pixel (x, y) by DELTAx. The distortion correction table is previously created so as to include a description about the shift amount indicating that the pixel (u, v) of the output image 100' corresponds to a virtual pixel (x+DELTAx, y) of the input image 100. The distortion correction block 24 can thereby mix the color information of the pixels (x, y) and (x+1, y) in a ratio of (1−DELTAx)/DELTAx to calculate the color information $C_{u,v}$ of the pixel (u, v) of the output image 100' by the following equation:

$$C_{u,v} = C_{x,y}(1-DELTAx) + C_{x+1,y}DELTAx$$

When there is a shift in the direction y, as shown in FIG. 19, in converting pixels P1 and P2 of an input image 100, which are adjacent in the direction y, into a pixel P1' of the output image 100' and converting pixels P3 and P4 of an input image 100, which are adjacent in the direction y, into a pixel P2' of the output image 100', the color information of the pixel P1' of the output image 100' is created using the color information of the pixels P1 and P2, which are adjacent in the direction y, and the color information of the pixel P2' of the output image 100' is created using the color information of the pixels P3 and P4 of the input image 100, which are adjacent in the direction y.

A shift amount DELTAy in the direction y is represented by a value of 0 or more and less than 1, and the shift amount of 0 or 1 represents that the representative position of a pixel of the input signal matches the representative position of any one of the adjacent pixels. Specifically, in converting two pixels of the input image 100 adjacent in the direction y into a single pixel in the output image 100', when the shift amount DELTAy is provided between the input image 100 and the output image 100', as shown in FIG. 20(*a*), the color information of the pixel P1(*x*, y) of the input image and the color information of the adjacent pixel P2(*x*, y+1) are averaged in a ratio of 1−DELTAy/DELTAy to obtain color information $C_{x,y+DELTAy} = C_{x,y}(1-DELTAy) + C_{x,y+1}DELTAy$ of a virtual pixel P(x, y+DELTAy) as the color information of the pixel of the output image 100'. As shown in FIG. 20(*b*), the color information of a pixel P'(u, v) of the output image 100' after the conversion corresponding to the virtual input pixel (x, y+DELTAy) can be obtained by:

$$C_{x,y+DELTAy} = C_{x,y}(1-DELTAy) + C_{x,y+1}DELTAy$$

In such a manner, in order to generate the output image 100' by performing the color information interpolating distortion correction processing using two pixels in the direction y when there is a shift between the input image 100 and the output image 100' in the direction y, the distortion correction unit 3 previously stores the distortion correction table including a description about the shift amounts in the conversion table reading/storing block 27. As shown in FIG. 19, the distortion correction block 24 generates each of the pixels P1' and P2' of the output image 100' from two pixels of the input image 100 in the direction y. Accordingly, as for the two pixels of the input image 100 and the pixel of the output image 100', the color information of the pixel of the output image 100' is calculated according to in what ratio the color information of the two pixels of the input image 100 affects the color information of the pixel of the output image 100'.

It is assumed that a pixel of the input image 100 corresponding to a pixel (u, v) of the output image 100' is shifted from a pixel (x, y) by DELTAy. The distortion correction table is previously created so as to include a description about the shift amount indicating that the pixel (u, v) of the output image 100' corresponds to a virtual pixel (x, y+DELTAy) of the input image 100. The distortion correction block 24 can thereby mix the color information of the pixels (x, y) and (x, y+1) in a ratio of (1−DELTAy)/DELTAy to calculate the color information $C_{u,v}$ of the pixel (u, v) of the output image 100' by the following equation:

$$C_{u,v} = C_{x,y}(1-DELTAy) + C_{x,y+1}DELTAy$$

Furthermore, in the case where there are shifts in the directions x and y, as shown in FIG. 21, in converting pixels P1 to P4 of the input image 100, which are adjacent in the directions x and y, into a pixel P1' of the output image 100' and converting pixels P5 and P8 of the input image 100, which are adjacent in the directions x and y, into a pixel P2' of the output image 100', the color information of the pixel P1' of the output image 100' is created using the color information of the pixels P1 to P4, which are adjacent in the directions x and y, and the color information of the pixel P2' of the output image 100' is created using the color information of the pixels P5 to P8 of the input image 100, which are adjacent in the directions x and y.

When there are shifts DELTAx and DELTAy in the directions x and y, respectively, in converting four pixels of the input image 100 adjacent in the directions x and y into a single pixel of the output image 100', as shown in FIG. 22(*a*), the color information of the pixel P1(*x*, y), the color information of the pixel P2(*x*+1, y), the color information of the pixel P3(*x*, y+1), and the color information of the pixel P4(*x*+1, y+1) of the input image 100 are averaged in a ratio of (1−DELTAx)(1−DELTAy)/DELTAx(1−DELTAy)/(1−DELTAx)DELTAy/DELTAxDE LTAy. Color information $C_{x+DELTAx,y+DELTAy} = C_{x,y}(1-DELTAx)(1-DELTAy) + C_{x+1,y}DELTAx(1-DELTAy) + C_{x,y+1}(1-DELTAx)DELTAy + C_{x+1,y+1}DELTAxDELTAy$, which is a mixture of the four pixels, can be obtained, and, as shown in FIG. 22(*b*), the color information of a pixel P'(*u*, v) of the output image 100' after the conversion corresponding to the virtual input pixel (x+DELTAx, y+DELTAy) can be obtained as:

$$\begin{aligned}i\ C_{x+DELTAx,y+DELTAy} &= C_{x,y}(1-DELTAx)(1-DELTAy) + \\ &\quad C_{x+1,y}DELTAx(1-DELTAy) + C_{x,y+1}(1-DELTAx) \\ &\quad DELTAy + C_{x+1,y+1}DELTAxDELTAy\end{aligned}$$

In such a manner, in order to generate the output image 100' by performing the color information interpolating distortion correction processing using two pixels in each of the directions x and y when there are shifts between the input image 100 and the output image 100' in the directions x and y, the virtual reality creating system previously stores the distortion correction table including the description about the shift amounts in the conversion table reading/storing block 27. As shown in FIG. 21, the distortion correction block 24 generates each of the pixels P1' and P2' of the output image 100' from the four pixels of the input image 100 in the directions x and y. Accordingly, using color information of four pixels of the input image 100 and the pixel of the output image 100', the color information of the output image 100' is calculated according to in what ratio the color information of the four pixels of the input image 100 affects the color information of the pixel of the output image 100'.

Herein, it is assumed that a pixel of the input image 100 corresponding to the pixel (u, v) of the output image 100' is shifted from a pixel (x, y) by DELTAx and DELTAy. The distortion correction table is previously created so as to include the description about the shift amounts indicating that the pixel (u, v) of the output image 100' corresponds to a virtual pixel (x+DELTAx, y+DELTAy) of the input image 100. The distortion correction block 24 can thereby mix the color information of the pixels (x, y), (x+1, y), (x, y+1), and (x+1, y+1) in a ratio of (1−DELTAx)(1−DELTAy)/DELTAx (1−DELTAy)/(1−DELTAx)DELTAy/DELTAxDE LTAy to calculate the color information $C_{u,v}$ of the pixel (u, v) of the output image 100' by the following equation:

$$C_{x+DELTAx, y+DELTAy} = C_{x,y}(1-DELTAx)(1-DELTAy) + C_{x+1,y}DELTAx(1-DELTAy) + C_{x,y+1}(1-DELTAx)DELTAy + C_{x+1,y+1}DELTAxDELTAy$$

The distortion correction table for such color information interpolating distortion correction processing is constituted by storing pixels (not less than two) of the input image as interpolation objects and the shift amounts for each pixel of the output image. These shift amounts are fractions of the x and y coordinates of the pixel position obtained by the coordination transformation according to the distortion correction table. A certain pixel (u, v) of the output image 100' usually corresponds to a pixel of the input image 100 which has x and y coordinates of integers, such as (10, 5). However, taking consideration that a certain pixel (u, v) of the output image 100' overlaps two to four pixels of the input image 100, the virtual reality creating system to which the present invention is applied assumes shifts of fractions, such as 0.3 pixel in the direction x and 0.55 in the direction y in the case where a certain pixel of the output image 100' corresponds to a pixel (10.3, 5.55) of the input image 100. To create the color information of the output image 100' using two pixels adjacent only in the direction x or y, it is only necessary to register any one of the shift amounts in the direction x or y in the distortion correction table.

The shift amounts in this distortion correction table may be represented like the aforementioned (10.3, 5.55) or represented by only fractions like (0.3, 0.55). Furthermore, the shift amounts in the distortion correction table may be described with integers of 0 to 9 which are ten times fractions to one place or with integers of 0 to 100 which are a hundred times fractions represented to the two places. In this case, the shift amounts are divided by 10 or 100 for use in the color information interpolating distortion correction processing. This eliminates information represented by fractional values from the distortion correction table, thus allowing the distortion correction table to only include the information represented by integers. Furthermore, in the case where the processing of the distortion correction unit 3 to perform the color information interpolating distortion correction processing and the like is performed in base n representation, the shift amounts may be described by values of 0 to $n^r-1$ and divided by $n^r$ for the color information interpolating distortion correction processing. In such a case, the shift amounts (base n) described as values of 0 to $n^r-1$ only needs to be shifted right by r places for the color information interpolating distortion correction processing. For example, in the case where the processing by the distortion correction unit 3 is performed using binary values, the shift amounts are described as values of 1 to 15 ($2^4-1$) and divided by 16 for use at the color information interpolating distortion correction processing. The processing of division by 16 is only right shifting the bits by four. The r may be 8 ($2^4$), 32($2^5$), or the like.

When the shift amounts are represented by integers of 0 to 9 or 0 to 100 or represented by 0 to 16 for binary processing of the distortion correction unit 3, accuracies thereof are 0.1, 0.01, and $\frac{1}{16}$, respectively. However, the number of bits used to represent the shift amounts with integers can be significantly less than the number of bits used to represent the shift amounts with fractional values, thus reducing the amount of data of the distortion correction table. Moreover, by representing the shift amount according to base n numbers treated by the distortion correction unit 3, it is possible to include only information represented by integers and not include the information represented by fractional values in the distortion correction table and as well as to make the processing amounts smaller than that required to divide the shift amounts of integers by 10 or 100.

As described above, according to the virtual reality creating system to which the present invention is applied, the distortion correction processing is performed according to the distortion correction table, and the pixel information (color information) of each pixel of the output image 100' after the conversion is calculated using at least two pixels of the input image 100 in the direction x or y corresponding to the pixel. It is therefore possible to smooth the variation in the color information between adjacent pixels within the output image 100' and reduce jaggies.

It is basically desirable that the color information interpolating distortion correction processing is performed using four pixels of the input image 100 adjacent in the directions x and y. However, depending on the pattern of the image displayed on the screen, the occurrence of jaggies can be suppressed even if the color information of the output image 100' is calculated using two pixels adjacent only in any one of the directions x and y. For example, in the case of projecting onto the screen 1 an image including columns vertically extending and standing side by side in the image, there is not so much need to create the color information of the output image 100' using two pixels adjacent in the direction y. On the other hand, in the case of projecting onto the screen 1 an image including many sticks horizontally extending in the image, there is not so much need to create the color information of the output image 100' using two pixels adjacent in the direction x. Moreover, when the image projected onto the screen includes a grid pattern, periodic jaggies can occur even if the color information of the output image 100' is created using the color information of the pixels adjacent in any one of the directions x and y.

In the color information interpolating distortion correction processing using the aforementioned distortion correction table including the description about the shift amounts, a plurality of primary color signals such as RGB (red, green, and blue) and CMY (cyan, magenta, and yellow) as the color information of the input and output images 100 and 100' may be used. In this case, the distortion correction block 24 creates the color information of the output image 100' by mixing the color information of adjacent pixels of the input image 100 by the same processing method independently for each primary color of R (red component), G (green component), and B (blue component) signals or C (cyan), M (magenta), and Y (yellow) signals. The color information represented by three primary colors, especially RGB, has an advantage of fitting to color representation systems of computer graphic images and output image 100' to the projectors 2a and 2b, thus providing the output image 100' with little jaggies. Moreover, the color information of the output image 100' can be created in parallel for each primary color, thus speeding up the color information interpolating distortion correction processing. Furthermore, the color information of the output image 100' may be created by performing the color information interpolating distortion correction processing using the alpha value of the transparency in addition to the three primary colors of RGB in parallel in a similar manner to the three primary colors of RGB.

Furthermore, in the color information interpolating distortion correction processing using the aforementioned distortion correction table including the description about the shift amounts, the color information of the input and output images 100 and 100' may be a signal including brightness information (Y) and color difference information (U (a difference between the brightness signal and a blue component) and V (a difference between the brightness signal and a red component), such as YUV (YCbCr). In this case, the distortion correction block 24 creates the color information of the output image 100' by mixing the color information of adjacent pixels of the input image 100 by the same processing method independently for the brightness information and color difference information. The color information interpolating distortion correction processing can be therefore performed according to the color information fit to the color representation method of the output image 100'. Moreover, using human's visual characteristics of being sensitive to the brightness information and not sensitive to the color difference information, the color information interpolating distortion correction processing can be performed using only the brightness information of the input image 100 to calculate the brightness information of the output image 100' while being performed using the color difference information of some pixels of each group of pixels, thus speeding up the color information interpolating distortion correction processing. For example, while as for the brightness information, the brightness information of the output image 100' is created from four pixels in the directions x and y, as for the color difference information, the color difference information of the output image 100' may be created using only two diagonal pixels among the four pixels.

Next, a description is given of an operation of the virtual reality creating system when the distortion correction table including the description about the shift amounts for the aforementioned color information interpolating distortion correction processing is described in an input order of the input image 100.

The input image 100 as a processing object of the color information interpolating distortion correction processing is inputted to the image input terminals 3a to 3d and supplied to the distortion correction block 24 via the input image processing block 21, image switching/dividing block 22, and image composition block 23. Generally, the data is sequentially supplied to the distortion correction block 24 along a scanning line of the input image 100.

When the color information interpolating distortion correction processing is performed in the input order of pixels of the input image 100, the distortion correction unit 3 previously stores the distortion correction table in the conversion table reading/storing block 27, the distortion correction table describing the coordinates of a pixel in the output image 100' after the conversion which are related to the coordinates of each pixel of the input image described in the input order. This distortion correction table is created by the parameter adjusting personal computer 5. The distortion correction table also describes the shift amounts for the color information interpolating distortion correction processing.

As shown in input images of FIGS. 23(a) and 23(b), in the case where pixels of the input image 100 are inputted in an order of P1, P2, P3, . . . and the color information of a pixel of the output image 100 is created by mixing the color information of two pixels of the input image 100 which are adjacent in the direction x, upon reading first two pixels P1 and P2, the distortion correction block 24 first calculates all the color information of the output image 100' which can be calculated using the two pixels P1 and P2. In this example, the distortion correction block 24 mixes the color information of the two pixels P1 and P2 to crate the color information of pixels P1', P2', and P3' of the output image 100' shown in FIG. 23(a). In this case, in the distortion correction table, the pixels P1 and P2 of the input image 100 correspond to the pixels P1' to P3' of the output image 100', and the color information of each of the pixels P1' to P3' is processed so as to be the color information including the color information of the pixels P2 and P3 mixed in a ratio according to the shift amounts thereof. The ratios of the color information of the pixels P1 and P2 mixed for individually generating pixels P1' to P3' are different from each other.

Next, when a pixel P3 subsequent to the pixels P1 and P2 is inputted to the distortion correction block 24, the distortion correction block 24 calculates all the color information of the output image 100' which can be calculated using the two pixels P2 and P3. In this example, the distortion correction block 24 performs the processing with reference to the distortion correction table so that the pixels P2 and P3 of the input image 100 correspond to the pixels P4' to P5' of the output image 100' and the color information of each of the pixels P4' to P5' becomes the color information including the color information of the pixels P2 and P3 mixed in a ratio according to the shift amounts thereof.

By calculating the color information of all the pixels of the output image 100' which can be calculated from each two pixels of the input image 100 while shifting pixels of the input image 100 in the direction x from the first two pixels to the last two pixels sequentially one by one in such a manner, the color information of all the pixels of the output image 100' is calculated. Accordingly, the distortion correction block 24 only needs to always store at least two pixels of the input image 100 in the direction x and can perform the color information interpolating distortion correction processing with a delay of time taken to read a pixel. It is therefore possible to minimize the time for the distortion correction block 24 to wait for data and reduce the processing delay in the distortion correction block 24.

As shown in input images of FIGS. 24(a) and 24(b), in the case of receiving pixels of the input image 100 in an order of P1, P3, . . . starting from the first pixel of a first line (scanning line) and then receiving P2, P4, . . . starting from the first pixel of a second line and mixing the color information of two pixels of the input image 100 adjacent in the direction y to create the color information of each pixel of the output image 100, upon reading the first pixel P1 of the first line and the first pixel P2 of the second line, the distortion correction block 24 first calculates all the color information of the output image 100' which can be calculated using the two pixels P1 and P2. The distortion correction block 24 stores the pixels of the first line until receiving the pixel P2. In this example, the distortion correction block 24 mixes the color information of the two pixels P1 and P2 to crate the color information of pixels P1' and P2' of the output image 100' shown in FIG. 24(a). In this case, the distortion correction table describes that the pixels P1 and P2 of the input image 100 correspond to the pixels P1' and P2' of the output image 100' and the color information of each pixel becomes a mixture of the color information of the pixels P1 and P2 in a ratio according to the shift amounts thereof. The ratios of the color information of the pixels P1 and P2 mixed for generating the pixels P1' and P2' are different from each other.

Next, as shown in FIG. 24(b), when a pixel P4 subsequent to the pixel P2 is inputted into the distortion correction block 24, the distortion correction block 24 calculates all the color information of the output image 100' which can be calculated using the pixels P3 and P4. In this example, the distortion correction block 24 performs processing with reference to the distortion correction table so that the pixels P3 and P4 of the input image 100 correspond to the pixel P3' of the output image 100' and the color information of the pixel P3' becomes a mixture of the color information of the pixels P3 and P4 in a ratio according to the shift amounts thereof.

The color information of all the pixels of the output image 100' is obtained by first performing the color information interpolating distortion correction processing after the distortion correction block 24 receives two pixels of the input image 100 adjacent in the direction y in such a manner. The distortion correction block 24 only needs to always store at least one line of pixels in the direction x and a pixel of the input image 100 in the calculation memory 15. The distortion correction block 24 performs the color information interpolating distortion correction processing with a delay of a time for a line of pixels in the direction x and can shorten the time to wait for data, thus reducing the processing delay in the distortion correction block 24.

As shown in input images of FIGS. 25(a) and 25(b), in the case of receiving pixels of the input image 100 in an order of P1, P2, ... starting from the first pixel of the first line and then P3, P4, ... starting from the first pixel of the second line and mixing the color information of four pixels of the input image 100 adjacent in the directions x and y to create the color information of each pixel of the output image 100', upon reading the first pixels P1 and P2 of the first line and the first pixels P3 and P4 of the second line, the distortion correction block 24 calculates all the color information of the output image 100' which can be calculated using the four pixels P1 to P4. In this example, the distortion correction block 24 mixes the color information of the four pixels P1 to P4 to create the color information of a pixel P1' of the output image 100' shown in FIG. 25(a). In this case, the distortion correction table describes that the pixels P1 to P4 of the input image 100 correspond to the pixel P1' of the output image 100' and the color information thereof becomes a mixture of the color information of the pixels P1 to P4 in a ratio according to the shift amounts thereof.

Next, as shown in FIG. 25(b), when a pixel P6 subsequent to the pixel P4 is inputted into the distortion correction block 24, the distortion correction block 24 calculates all the color information of the output image 100' which can be calculated using the pixels P2 and P5 stored when the first line is inputted and the pixels P4 and P6. In this example, the distortion correction block 24 performs processing with reference to the distortion correction table so that the pixels P2, P5, P4, and P6 of the input image 100 correspond to the pixels P2' to P4' of the output image 100' and the color information of each of the pixels P2' to P4' becomes a mixture of the color information of the pixels P2, P5, P4, and P6 in a ratio according to the shift amounts thereof.

The color information of all the pixels of the output image 100' is calculated by performing the color information interpolating distortion correction processing after the distortion correction block 24 receives four pixels of the input image 100 adjacent in the directions x and y in such a manner. The distortion correction block 24 only needs to always store at least one line of pixels in the direction x and two pixels of the input image 100 in the calculation memory 15. The distortion correction block 24 therefore performs the color information interpolating distortion correction processing with a delay of a time for a line of pixels in the direction x and a pixel and can shorten the time to wait for data even when there are shifts both in the directions x and y, thus reducing the processing delay in the distortion correction block 24.

Next, a description is given of an operation of a virtual reality creating system when the distortion correction table for the aforementioned color information interpolating distortion correction processing is described in an output order of the output image 100'.

The output image 100' after the color information interpolating distortion correction processing is outputted from the distortion correction block 24 to the output image processing block 25. Generally, data is sequentially outputted from the distortion correction block 24 to the output image processing block 25 along a scanning line of the input image 100 on a pixel basis. Considering outputting data of a general output image 100' along the scanning line on a pixel basis without dropping a pixel, the pixel coordinates of the output image are obvious in the distortion correction processing if the distortion correction table is represented in the order of the pixels on the output side, thus making a correspondence map describing only the image coordinates on the input side starting from the top of the distortion correction table. This can reduce the size of the distortion correction table to save a memory area of the conversion table reading/storing block 27. Moreover, this distortion correction table also describes the shift amounts for the color information interpolating distortion correction processing. The distortion correction table including the description about the shift amounts is created by the parameter adjusting personal computer 5.

In the case of storing such a distortion correction table in the conversion table reading/storing block 27 and creating the color information of each pixel of the output image 100' by mixing the color information of two pixels of the input image 100 adjacent in the direction x, as shown in FIG. 26(a), first, upon reading from the top of the input image 100 two pixels P1 and P2 of input image adjacent in the direction x which are described in the top of the distortion correction table, the distortion correction block 24 creates the color information of a first pixel P1' of the output image 100' using the two pixels P1 and P2, which are adjacent in the direction x, and outputs data of the pixel P1' to the output image processing block 25. Next, as shown in FIG. 26(b), to generate a pixel P2' of the output image 100' subsequent to the pixel P1', upon reading two pixels P3 and P4 of the input image 100 adjacent in the direction x with reference to the distortion correction table, the distortion correction block 24 creates the color information of the pixel P2' of the output image 100' using the two pixels P3 and P4 of the input image 100, which are adjacent in the direction x, and outputs data of the pixel P2' to the output image processing block 25.

In the case of creating the color information of each pixel of the output image 100' by mixing the color information of two pixels of the input image 100 adjacent in the direction y, as shown in FIG. 27(a), first, upon reading two pixels P1 and P2 of the input image 100, which are adjacent in the direction y and are described in the top of the distortion correction table, starting from the top of the input image 100, the distortion correction block 24 creates the color information of a first pixel P1' of the output image 100' using the two pixels P1 and P2, which are adjacent in the direction y, and outputs data of the pixel P1' to the output image processing block 25. Next, as shown in FIG. 27(b), to generate a pixel P2' of the output image 100' subsequent to the pixel P1', upon reading two pixels P3 and P4 of the input image 100, which are adjacent in the direction y, with reference to the distortion correction table, the distortion correction block 24 creates the color information of the pixel P2' of the output image 100' using the two pixels P3 and P4 of the input image 100, which are adjacent in the direction y, and outputs data of the pixel P2' to the output image processing block 25.

Furthermore, in the case of creating the color information of each pixel of the output image 100' by mixing the color information of four pixels of the input image 100 adjacent in the directions x and y, as shown in FIG. 28(a), first, upon reading four pixels P1 to P4 of the input image 100, which are adjacent in the directions x and y and are described in the top of the distortion correction table, starting from the top of the input image 100, the distortion correction block 24 creates the color information of a first pixel P1' of the output image 100' using the four pixels P1 to P4, which are adjacent in the directions x and y and outputs data of the pixel P1' to the output image processing block 25. Next, as shown in FIG. 28(b), to generate a pixel P2' of the output image 100' subsequent to the pixel P1', upon reading four pixels P5 to P8 of the input image 100, which are adjacent in the directions x and y, with reference to the distortion correction table, the distortion correction block 24 creates the color information of the pixel P2' of the output image 100' using the four pixels P5 to P8 of the input image 100, which are adjacent in the directions x and y, and outputs data of the pixel P2' to the output image processing block 25.

The aforementioned embodiments are just examples of the present invention. The present invention is therefore not limited to the aforementioned embodiments, and it is obvious that various modifications can be made according to the design and the like without departing from the technical idea according to the present invention other than the embodiments.

For example, in the aforementioned embodiments, using square pixels in a two-axis orthogonal coordinate system, color interpolation using two pixels adjacent in the direction x or y and color interpolation using four pixels adjacent in the directions x and y are performed. However, in the case of an image signal in a three-axis coordinate system including triangular pixels, color interpolation can be carried out using a hexagonal pixel group including six adjacent triangular pixels.

INDUSTRIAL APPLICABILITY

The present invention is applicable to a purpose of projecting an image on a screen to create reality of the image in order to provide a realistic image space to a viewer.

The invention claimed is:

1. An image signal processing apparatus outputting, to a projector, an output image signal to project image light onto a projection plane of an arbitrary shape, the image signal processing apparatus comprising:
   an image signal input which receives a two-dimensional image signal to project image light onto a two-dimensional projection plane;
   an external input which externally receives
      a distortion correction table as a correspondence map between the two-dimensional projection plane and a mesh model of the projection plane of the arbitrary shape, the distortion correction table being used to perform distortion correction processing for the two-dimensional image signal received by the image signal input;
   a distortion corrector which performs the distortion correction processing for each pixel of the two-dimensional image signal received by the image signal input with reference to the distortion correction table received by the external input to generate the output image signal to project the image light onto the projection plane; and
   an output which outputs the output image signal generated by the distortion corrector to the projector,
   wherein the distortion correction table describes at least one shift amount for each pixel of a plurality of pixels for shifting the pixel from a first point before conversion to a second point after the conversion,
   the distortion corrector mixes color information of the plurality of pixels before the conversion in a ratio corresponding to the shift amount of each pixel, and
   the distortion corrector generates the output image signal with mixed color information of the color information of the plurality of pixels after the conversion of each of the plurality of pixels.

2. The image signal processing apparatus according to claim 1, wherein
   the external input inputs a control signal externally controlling an operation of the projector; and
   the output outputs the control signal received by the external input to the projector together with the output image signal.

3. The image signal processing apparatus according to claim 1, wherein
   the image signal input is configured to simultaneously receive a plurality of two-dimensional image signals, and
   the output is configured to simultaneously output a plurality of output image signals, the image signal processing apparatus further comprising:
      a signal processor which, upon receiving the plurality of two-dimensional image signals simultaneously received by the image signal input, performs one of processing to make a selection from the plurality of two-dimensional image signals for output through the output and processing to output from the output the output image signal obtained by composing the plurality of two-dimensional image signals.

4. The image signal processing apparatus according to claim 3, further comprising:
   a synchronization processor which synchronizes the processing by the signal processor for the plurality of two-dimensional image signals.

5. The image signal processing apparatus according to claim 3, further comprising:
   a stereoscopic image disparity two-dimensional image signal generator which generates a disparity image signal using the plurality of two-dimensional image signals received by the image signal input, wherein
   the distortion corrector performs the distortion correction processing for the disparity image signal generated by the stereoscopic image disparity two-dimensional image signal generator to generate the output image signal.

6. The image signal processing apparatus according to claim 1, wherein the distortion corrector generates the output image signal by one of a first process and a second process,
   the first process including mixing color information of at least two pixels adjacent in an X-axis direction before the conversion according to a position of the representative point of the pixel after the conversion relative to at least the two pixels, and the second process including mixing color information of at least two pixels adjacent in a Y-axis direction before the conversion according to the position of the representative point of the pixel after the conversion relative to at least the two pixels.

7. The image signal processing apparatus according to claim 1, wherein the distortion corrector uses a plurality of primary colors as the color information and mixes each of the primary colors of adjacent pixels to generate the output image signal.

8. The image signal processing apparatus according to claim 1, wherein the distortion corrector uses signals each including brightness information and a color difference signal as the color information and mixes the signals of adjacent pixels to generate the output image signal.

9. The image signal processing apparatus according to claim 1, wherein the distortion correction table describes a correspondence between the two-dimensional projection plane and the mesh model of the projection plane of the arbitrary shape in an order of input pixels of the two-dimensional image signal, and upon receiving each of the input pixels described in the distortion correction table, the distortion corrector performs the distortion correction processing using a received pixel.

10. The image signal processing apparatus according to claim 1, wherein the distortion correction table describes a correspondence between the two-dimensional projection plane and the mesh model of the projection plane of the arbitrary shape in an order of output pixels of the output image signal, and upon receiving each input pixel described in the distortion correction table, the distortion corrector performs the distortion correction processing using a received pixel and generates the output image signal in an order of the output pixels described in the distortion correction table.

11. A virtual reality creating system, comprising:

a screen including a projection plane of an arbitrary shape with a concave surface faced to a viewer, the screen being capable of displaying an image wider than an effective angle of view of the viewer;

an image signal processor that performs distortion correction used for projecting image light onto the projection plane of the arbitrary shape for a two-dimensional image signal to project image light onto a two-dimensional projection plane and then outputting an output image signal;

an external processor which creates a distortion correction table as a correspondence map between the two-dimensional projection plane and a mesh model of the projection plane of the arbitrary shape; and a projector which projects an image based on the output image signal outputted from the image signal processor onto the screen, wherein the image signal processor includes:

an image signal input which receives the two-dimensional image signal;

an external input which receives a distortion correction table as a correspondence map between the two-dimensional projection plane and a mesh model of the projection plane of the arbitrary shape, the distortion correction table being used to perform the distortion correction processing for the two-dimensional image signal received by the image signal input;

a distortion corrector which performs distortion correction processing for each pixel of the two-dimensional image signal received by the image signal input with reference to the distortion correction table received by the external input to generate the output image signal to project the image light onto the projection plane of the arbitrary shape; and an output which outputs the output image signal generated by the distortion corrector to the projector, wherein the distortion correction table describes at least one shift amount for each pixel of a plurality of pixels for shifting the pixel from a first point before conversion to a second point after the conversion, the distortion corrector mixes color information of the plurality of pixels before the conversion in a ratio corresponding to the shift amount of each pixel, and the distortion corrector generates the output image signal with mixed color information of the color information of the plurality of pixels after the conversion of each of the plurality of pixels.

* * * * *